US012518693B2

(12) United States Patent
Huang et al.

(10) Patent No.: US 12,518,693 B2
(45) Date of Patent: Jan. 6, 2026

(54) PIXEL CIRCUIT, DISPLAY PANEL, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yao Huang, Beijing (CN); Zhenhua Zhang, Beijing (CN); Dongfang Yang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 42 days.

(21) Appl. No.: 18/549,048

(22) PCT Filed: Aug. 31, 2022

(86) PCT No.: PCT/CN2022/116200
§ 371 (c)(1),
(2) Date: Sep. 5, 2023

(87) PCT Pub. No.: WO2024/045040
PCT Pub. Date: Mar. 7, 2024

(65) Prior Publication Data

US 2025/0046243 A1 Feb. 6, 2025

(51) Int. Cl.
*G09G 3/3233* (2016.01)

(52) U.S. Cl.
CPC ..................... *G09G 3/3233* (2013.01); *G09G 2300/0819* (2013.01); *G09G 2300/0852* (2013.01);

(Continued)

(58) Field of Classification Search
CPC ......... G09G 3/3233; G09G 2300/0819; G09G 2300/0852; G09G 2300/0861;

(Continued)

(56) References Cited

U.S. PATENT DOCUMENTS 11,189,228 B2 * 11/2021 Li ........................ G09G 3/3258
2016/0063922 A1 3/2016 Tsai et al.

(Continued)

FOREIGN PATENT DOCUMENTS

CN 112530341 A 3/2021
CN 113593469 A 11/2021

(Continued)

OTHER PUBLICATIONS

European Search Report for Application No. 22956869.6, Mar. 31, 2025, 23 pages.

*Primary Examiner* — Jeff Piziali
(74) *Attorney, Agent, or Firm* — BROOKS KUSHMAN P.C.

(57) ABSTRACT

A pixel circuit, a display panel, and a display device. The pixel circuit includes a light-emitting element, a pre-charging circuit, a first energy storage circuit, a data writing circuit and a driving circuit; the pre-charging circuit writes a data voltage into a pre-charging node under the control of a pre-charging scanning signal; the first energy storage circuit is electrically connected to the pre-charging node for storing electric energy; the data writing circuit controls the connection or disconnection between the pre-charging node and the first terminal of the driving circuit under the control of the first scanning signal; the first terminal of the driving circuit is electrically connected to the light-emitting element for driving the light-emitting element. The present disclosure enables the threshold voltage compensation to be completed during the data writing phase without the line scan time limitation during high frequency display.

19 Claims, 12 Drawing Sheets

(52) U.S. Cl.
CPC ............... *G09G 2300/0861* (2013.01); *G09G 2310/0251* (2013.01); *G09G 2310/08* (2013.01); *G09G 2320/0247* (2013.01); *G09G 2320/045* (2013.01); *G09G 2340/0435* (2013.01)

(58) Field of Classification Search
CPC ....... G09G 2310/0251; G09G 2310/08; G09G 2320/0247; G09G 2320/045; G09G 2340/0435; G09G 2310/0262; G09G 2320/0233; G09G 2320/043
See application file for complete search history.

(56) References Cited

U.S. PATENT DOCUMENTS

| | | | | |
|---|---|---|---|---|
| 2019/0156781 | A1 | 5/2019 | Abe et al. | |
| 2020/0251057 | A1* | 8/2020 | Sun | G09G 3/3266 |
| 2021/0064087 | A1* | 3/2021 | Ma | G06F 1/189 |
| 2021/0193022 | A1* | 6/2021 | Xuan | G09G 3/3233 |
| 2022/0122522 | A1 | 4/2022 | Li et al. | |
| 2022/0180810 | A1* | 6/2022 | Zhang | G09G 3/3241 |
| 2023/0031984 | A1 | 2/2023 | Wang et al. | |
| 2023/0133704 | A1* | 5/2023 | Gai | G09G 3/20 345/691 |

FOREIGN PATENT DOCUMENTS

| | | | |
|---|---|---|---|
| CN | 113658555 | A | 11/2021 |
| CN | 113744683 | A | 12/2021 |
| CN | 113838420 | A | 12/2021 |
| CN | 113870786 | A | 12/2021 |
| CN | 113906495 | A | 1/2022 |
| CN | 113950715 | A | 1/2022 |
| CN | 114464133 | A | 5/2022 |
| CN | 114222615 | B | 8/2022 |

* cited by examiner

PIXEL CIRCUIT, DISPLAY PANEL, AND DISPLAY DEVICE

CROSS-REFERENCE TO RELATED APPLICATION

This application is the U.S. national phase of PCT Application No. PCT/CN2022/116200 filed on Aug. 31, 2022, which is incorporated herein by reference in its entirety.

TECHNICAL FIELD

The present disclosure relates to the field of display technology, and more particularly, to a pixel circuit, a display panel, and a display device.

BACKGROUND

In the related art, in a scenario of high-frequency refreshing, the pixel circuit does not have sufficient time to perform threshold voltage compensation due to the limitation of line scanning time, thereby the display quality is affected. Especially for large and medium sized display panels, full band support from low frequency to high frequency cannot be achieved.

SUMMARY

In an aspect, an embodiment of the present disclosure provides a pixel circuit, including a light-emitting element, a pre-charging circuit, a first energy storage circuit, a data writing circuit and a driving circuit;

the pre-charging circuit is electrically connected to a pre-charging scanning line, a data line and a pre-charging node for writing a data voltage provided by the data line into the pre-charging node under the control of a pre-charging scanning signal provided by the pre-charging scanning line;

the first energy storage circuit is electrically connected to the pre-charging node for storing electric energy;

the data writing circuit is electrically connected to a first scanning line, the pre-charging node and a first terminal of the driving circuit for controlling the connection or disconnection between the pre-charging node and the first terminal of the driving circuit under the control of a first scanning signal provided by the first scanning line;

the first terminal of the driving circuit is electrically connected to the light-emitting element for driving the light-emitting element.

Optionally, in at least one embodiment of the present disclosure, the pixel circuit further includes a first light-emitting control circuit and a reset circuit;

the first terminal of the driving circuit is electrically connected to a first electrode of the light-emitting element via the first light-emitting control circuit;

the first light-emitting control circuit is electrically connected to a light-emitting control line for controlling the connection or disconnection between a first terminal of the driving circuit and a first electrode of the light-emitting element under the control of a light-emitting control signal provided by the light-emitting control line;

the reset circuit is electrically connected to a second scanning line, a first initial voltage terminal and the first electrode of the light-emitting element for writing a first initial voltage provided by the first initial voltage terminal into the first electrode of the light-emitting element under the control of a second scanning signal provided by the second scanning line;

a second electrode of the light-emitting element is electrically connected to a first voltage terminal.

Optionally, in at least one embodiment of the present disclosure, the pixel circuit further includes a compensation control circuit and a second energy storage circuit;

the compensation control circuit is electrically connected to the first scanning line, a control terminal of the driving circuit and a second terminal of the driving circuit for controlling the connection or disconnection between the control terminal of the driving circuit and the second terminal of the driving circuit under the control of the first scanning signal;

a first terminal of the second energy storage circuit is electrically connected to the control terminal of the driving circuit, a second terminal of the second energy storage circuit is electrically connected to the first electrode of the light-emitting element, and the second energy storage circuit is used for storing electric energy.

Optionally, in at least one embodiment of the present disclosure, the pixel circuit further includes an initialization circuit;

the initialization circuit is electrically connected to an initial control line, a second initial voltage terminal and the control terminal of the driving circuit for writing a second initial voltage provided by the second initial voltage terminal into the control terminal of the driving circuit under the control of an initial control signal provided by the initial control line.

Optionally, in at least one embodiment of the present disclosure, the pixel circuit further includes a second light-emitting control circuit;

the second light-emitting control circuit is electrically connected to a light-emitting control line and the second terminal of the driving circuit and a second voltage terminal for controlling the connection or disconnection between the second terminal of the driving circuit and the second voltage terminal under the control of a light-emitting control signal provided by the light-emitting control line.

Optionally, the pre-charging circuit comprises a first transistor, the data writing circuit comprises a second transistor, and the first energy storage circuit comprises a first capacitor;

a control electrode of the first transistor is electrically connected to the pre-charging scanning line, a first electrode of the first transistor is electrically connected to the data line, and a second electrode of the first transistor is electrically connected to the pre-charging node;

a control electrode of the second transistor is electrically connected to the first scanning line, a first electrode of the second transistor is electrically connected to the pre-charging node, and a second electrode of the second transistor is electrically connected to the first terminal of the driving circuit;

a first terminal of the first capacitor is electrically connected to the pre-charging node, and a second terminal of the first capacitor is electrically connected to a reference voltage terminal.

Optionally, the first light-emitting control circuit comprises a third transistor, and the reset circuit comprises a fourth transistor;

a control electrode of the third transistor is electrically connected to the light-emitting control line, a first electrode of the third transistor is electrically connected to a first terminal of the driving circuit, and a second electrode of the third transistor is electrically connected to the first electrode of the light-emitting element;

a control electrode of the fourth transistor is electrically connected to the second scanning line, a first electrode of the fourth transistor is electrically connected to the first initial voltage terminal, and a second electrode of the fourth transistor is electrically connected to the first electrode of the light-emitting element.

Optionally, the compensation control circuit comprises a fifth transistor, and the second energy storage circuit comprises a second capacitor;

a control electrode of the fifth transistor is electrically connected to the first scanning line, a first electrode of the fifth transistor is electrically connected to the control terminal of the driving circuit, and a second electrode of the fifth transistor is electrically connected to the second terminal of the driving circuit;

a first terminal of the second capacitor is electrically connected to the control terminal of the driving circuit, and a second terminal of the second capacitor is electrically connected to the first electrode of the light-emitting element.

Optionally, the initialization circuit comprises a sixth transistor;

a control electrode of the sixth transistor is electrically connected to the initial control line, a first electrode of the sixth transistor is electrically connected to the second initial voltage terminal, and a second electrode of the sixth transistor is electrically connected to the control terminal of the driving circuit.

Optionally, the second light-emitting control circuit comprises a seventh transistor;

a control electrode of the seventh transistor is electrically connected to the light-emitting control line, a first electrode of the seventh transistor is electrically connected to the second voltage terminal, and a second electrode of the seventh transistor is electrically connected to the second terminal of the driving circuit.

Optionally, the driving circuit comprises a drive transistor;

a control electrode of the drive transistor is electrically connected to the control terminal of the driving circuit, a first electrode of the drive transistor is electrically connected to the first terminal of the driving circuit, and a second electrode of the drive transistor is electrically connected to the second terminal of the driving circuit.

In a second aspect, an embodiment of the present disclosure provides a display panel comprising the pixel circuit as claimed in any one of claims 1 to 11;

the pre-charging circuit is configured for writing a data voltage provided by the data line into a pre-charging node under the control of a pre-charging scanning signal provided by the scanning line in a pre-charging phase so as to charge a first energy storage circuit using the data voltage;

the data writing circuit is configured for controlling conduction between the pre-charging node and the first terminal of the driving circuit under control of a first scanning signal provided by a first scanning line during a data writing phase.

Optionally, the pixel circuit further comprises a first light-emitting control circuit and a reset circuit;

the reset circuit is configured for writing a first initial voltage provided by a first initial voltage terminal into a first electrode of a light-emitting element under the control of a second scanning signal provided by a second scanning line in a refresh reset phase, so as to control the light-emitting element not to emit light;

a first light-emitting control circuit is configured for controlling the disconnection between a first terminal of the driving circuit and a first electrode of the light-emitting element under the control of a light-emitting control signal provided by a light-emitting control line during the refresh reset phase;

the refresh reset phase is the same phase as the data writing phase, or the data writing phase is included in the refresh reset phase.

Optionally, the pixel circuit further comprises a compensation control circuit, a second energy storage circuit and an initialization circuit;

the initialization circuit is configured for writing, in an initialization phase, a second initial voltage provided by a second initial voltage terminal into a control terminal of the driving circuit under the control of an initial control signal provided by an initial control line, so that, at the beginning of the data writing phase, the driving circuit can control conduction between the first terminal of the driving circuit and the second terminal of the driving circuit under the control of the potential of the control terminal of the driving circuit;

the compensation control circuit is configured for controlling, under the control of a first scanning signal, conduction between the control terminal of the driving circuit and the second terminal of the driving circuit during the data writing phase so as to charge a second energy storage circuit using the data voltage, and changing the potential of the control terminal of the driving circuit until the driving circuit is disconnected so as to perform threshold voltage compensation;

the pre-charging phase, the initialization phase, and the refresh reset phase are arranged sequentially.

Optionally, the pixel circuit further comprises a second light-emitting control circuit;

the first light-emitting control circuit is configured for controlling conduction between the first terminal of the driving circuit and the first electrode of the light-emitting element under the control of the light-emitting control signal in a refresh light-emitting phase;

the second light-emitting control circuit is configured for controlling the conduction between the second terminal of the driving circuit and a second voltage terminal under the control of the light-emitting control signal in the refresh light-emitting phase;

the driving circuit is configured for driving the light-emitting element to emit light during the refresh light-emitting phase;

the light emission phase is arranged after the refresh reset phase.

Optionally, the initialization phase, the data writing phase, and the refresh light-emitting phase are included in a refresh frame, and the pre-charging phase is included in a previous frame time of the refresh frame.

Optionally, a display period comprises the refresh frame, and the display period further comprises at least one holding frame arranged after the refresh frame; the holding frame comprises a holding reset phase and a holding light-emitting phase which are arranged successively;

the reset circuit is configured for writing a first initial voltage provided by a first initial voltage terminal into the first electrode of the light-emitting element under the control of the second scanning signal provided by the second scanning line in the holding reset phase, so as to control the light-emitting element not to emit light;

the first light-emitting control circuit is configured for controlling, under the control of the light-emitting control signal, conduction between a first terminal of the driving circuit and a first electrode of the light-emitting element during the holding light-emitting phase;

the second light-emitting control circuit is configured for controlling the conduction between the second terminal of the driving circuit and the second voltage terminal under the control of the light-emitting control signal during the holding light-emitting phase;

the driving circuit is configured for driving the light-emitting element to emit light during the holding light-emitting phase.

In a third aspect, an embodiment\ of the present disclosure further provides a display device comprising a plurality of rows and columns of pixel circuits as described above.

Optionally, a pre-charging circuit comprised in a (2N−1)th-row Mth-column pixel circuit and a pre-charging circuit comprised in a 2Nth-row Mth-column pixel circuit are electrically connected to an Nth pre-charging scanning line;

the pre-charging circuit included in the (2N−1)th-row Mth-column pixel circuit is electrically connected to a (2M−1)th-column data line, and the pre-charging circuit included in the 2Nth-row Mth-column pixel circuit is electrically connected to the 2Mth-column data line;

the pre-charging circuit included in the (2N−1)th-row Mth-column pixel circuit is configured for writing a data voltage provided by the (2M−1)th-column data line into a pre-charging node in the (2N−1)th-row Mth-column pixel circuit under the control of an Nth pre-charging scanning signal provided by the Nth pre-charging scanning line;

the pre-charging circuit included in a 2Nth-row Mth-column pixel circuit is configured for writing a data voltage provided by the 2Mth-column data line into the pre-charging node in the 2Nth-row Mth-column pixel circuit under the control of the Nth pre-charging scanning signal provided by the Nth pre-charging scanning line;

N and M are both positive integers.

DETAILED DESCRIPTION

The embodiments of the present disclosure will now be described more fully hereinafter with reference to the accompanying drawings, in which some, but not all embodiments of the disclosure are shown. Based on the embodiments in the present disclosure, all other embodiments obtained by a person of ordinary skill in the art without inventive effort fall within the scope of the present disclosure.

The transistors used in all the embodiments of the present disclosure may be triodes, thin film transistors or field effect transistors, or other devices with the same characteristics. In embodiments of the present disclosure, to distinguish the two electrodes of a transistor other than the control electrode, one of the electrodes is referred to as a first electrode while the other one is referred to as a second electrode.

In practical operation, when the transistor is a thin film transistor or a field effect transistor, the first electrode may be a drain electrode, and the second electrode may be a source electrode; alternatively, the first electrode may be a source electrode, and the second electrode may be a drain electrode.

Figure 1:
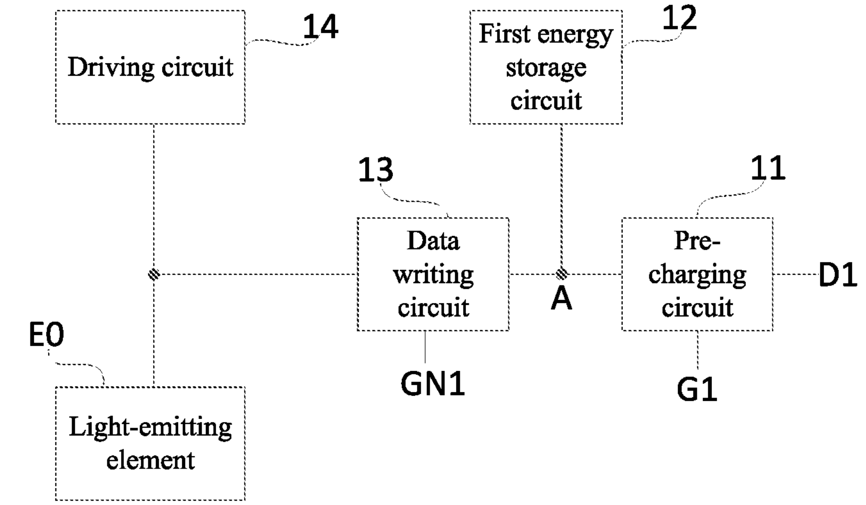
FIG. 1 is a structure diagram of a pixel circuit according to an embodiment of the present disclosure.

As shown in FIG. 1, the pixel circuit according to the embodiment of the present disclosure comprises a light-emitting element E0, a pre-charging circuit 11, a first energy storage circuit 12, a data writing circuit 13 and a driving circuit 14;

the pre-charging circuit 11 is electrically connected to a pre-charging scanning line G1, a data line D1 and a pre-charging node A for writing a data voltage Vdata provided by the data line D1 into the pre-charging node A under the control of a pre-charging scanning signal provided by the pre-charging scanning line G1;

the first energy storage circuit 12 is electrically connected to the pre-charging node A for storing electric energy;

the data writing circuit 13 is electrically connected to a first scanning line GN1, and the pre-charging node A is electrically connected to a first terminal of the driving circuit 14 for controlling the connection or disconnection between the pre-charging node A and the first terminal of the driving circuit 14 under the control of a first scanning signal provided by the first scanning line GN1;

the first terminal of the driving circuit 14 is electrically connected to the light-emitting element E0 for driving the light-emitting element E0.

When the pixel circuit of the embodiment of the present disclosure as shown in FIG. 1 is in operation, in a pre-charging phase, under the control of a pre-charging scanning signal provided by the pre-charging scanning line G1, the pre-charging circuit 11 writes a data voltage Vdata provided by the data line D1 into the pre-charging node A so as to charge the first energy storage circuit 12 via the data voltage Vdata;

in the data writing phase, the data writing circuit 13 controls the conduction between the pre-charging node A and the first terminal of the driving circuit 14 under the control of the first scanning signal supplied from the first scanning line GN1.

In a specific implementation, the data writing phase may be included in the current frame, and the pre-charging phase may be included in the previous frame; the pixel circuit according to the embodiment of the present disclosure firstly fills the data voltage Vdata provided by the data line D1 into the first energy storage circuit 12 via the pre-charging circuit 11 before the data voltage Vdata is written into the first terminal of the driving circuit; thus, when displaying at a high frequency, in the data writing phase, the threshold voltage compensation is not limited by the line scanning time, and the threshold voltage compensation can be completed, which is suitable for ultra-high frequency refresh, especially for a medium-large size, achieving full band support from a low frequency to a high frequency.

Figure 2:
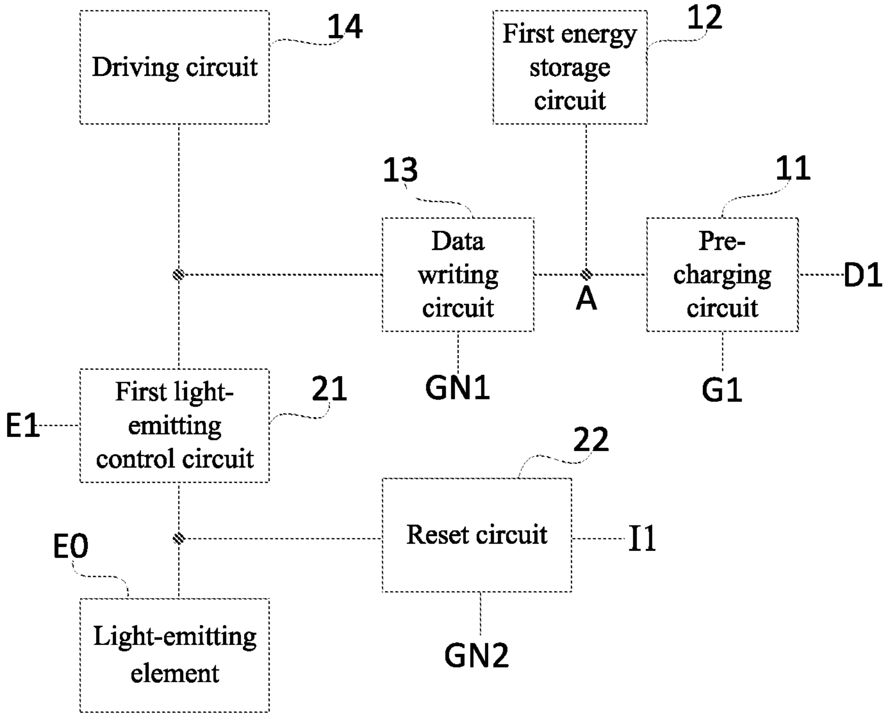
FIG. 2 is a structure diagram of a pixel circuit according to at least one embodiment of the present disclosure.

As shown in FIG. 2, on the basis of the embodiment of the pixel circuit shown in FIG. 1, in at least one embodiment of the present disclosure, the pixel circuit further comprises a first light-emitting control circuit 21 and a reset circuit 22;

the first terminal of the driving circuit 14 is electrically connected to a first electrode of the light-emitting element E0 via the first light-emitting control circuit 21;

the first light-emitting control circuit 21 is electrically connected to a light-emitting control line E1 for controlling the connection or disconnection between a first terminal of the driving circuit 14 and a first electrode of the light-emitting element E0 under the control of a light-emitting control signal provided by the light-emitting control line E1;

the reset circuit 22 is electrically connected to the second scanning line GN2, the first initial voltage terminal I1 and the first electrode of the light-emitting element E0 respectively, for writing the first initial voltage Vi1 provided by the first initial voltage terminal I1 into the first electrode of the light-emitting element E0 under the control of the second scanning signal provided by the second scanning line GN2;

the second electrode of the light-emitting element E0 is electrically connected to the first voltage terminal V1.

In at least one embodiment of the present disclosure, the first voltage terminal may be, but is not limited to, a ground terminal or a low voltage terminal;

the light-emitting element E0 may be an organic light-emitting diode, the first electrode of the light-emitting element E0 may be an anode, and the second electrode of the light-emitting element E0 may be a cathode.

When the pixel circuit of at least one embodiment of the present disclosure as shown in FIG. 2 is in operation, in a refresh reset phase, the reset circuit 22, under the control of the second scanning signal provided by the second scanning line GN2, writes a first initial voltage Vi1 provided by the first initial voltage terminal I1 into the first electrode of the light-emitting element E0 so as to control the light-emitting element E0 not to emit light; a first light-emitting control circuit 21 controls the disconnection between a first terminal of the driving circuit 14 and a first electrode of the light-emitting element E0 under the control of a light-emitting control signal provided by a light-emitting control line E1;

the refresh reset phase may be the same phase as the data writing phase, or the data writing phase may be included in the refresh reset phase.

Figure 3:
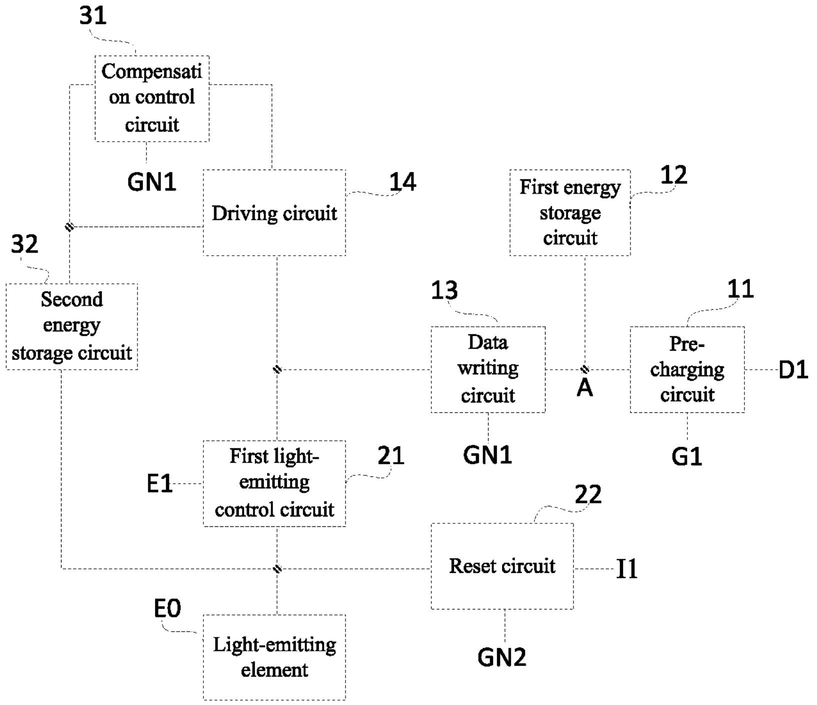
FIG. 3 is a structure diagram of a pixel circuit according to at least one embodiment of the present disclosure.

As shown in FIG. 3, on the basis of the at least one embodiment of the pixel circuit shown in FIG. 2, the pixel circuit according to the at least one embodiment of the present disclosure further comprises a compensation control circuit 31 and a second energy storage circuit 32;

the compensation control circuit 31 is electrically connected to the first scanning line GN1, a control terminal of the driving circuit 14 and a second terminal of the driving circuit 14 for controlling the connection or disconnection between the control terminal of the driving circuit 14 and the second terminal of the driving circuit 14 under the control of the first scanning signal;

the first terminal of the second energy storage circuit 32 is electrically connected to a control terminal of the driving circuit 14, a second terminal of the second energy storage circuit 32 is electrically connected to a first electrode of the light-emitting element E0, and the second energy storage circuit 32 is used for storing electric energy.

Optionally, the pixel circuit of at least one embodiment of the present disclosure further comprises an initialization circuit;

the initialization circuit is electrically connected to an initial control line, a second initial voltage terminal and the control terminal of the driving circuit for writing a second initial voltage provided by the second initial voltage terminal into the control terminal of the driving circuit under the control of an initial control signal provided by the initial control line.

Figure 4:
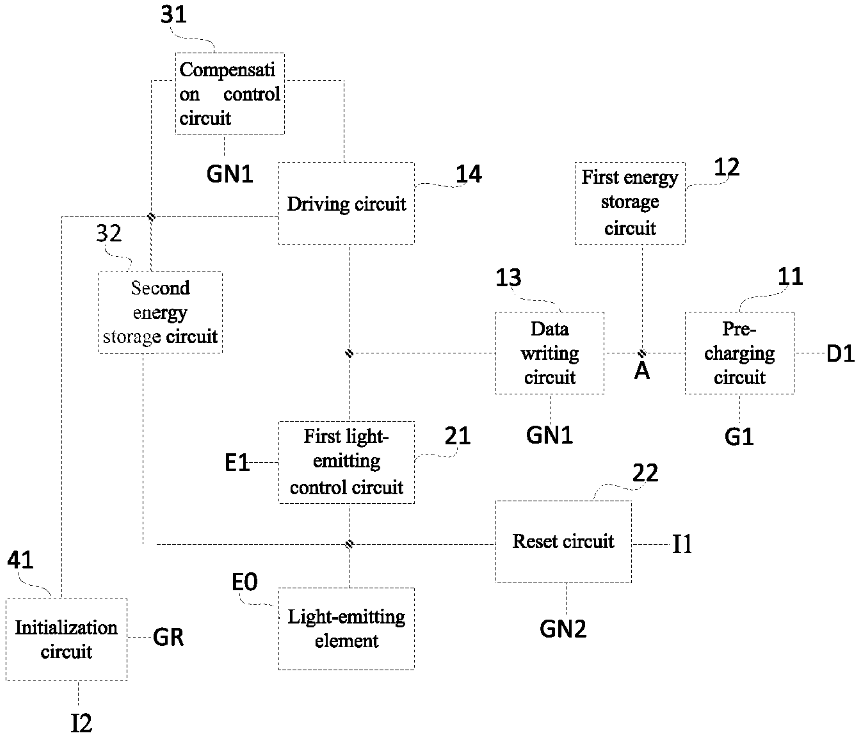
FIG. 4 is a structure diagram of a pixel circuit according to at least one embodiment of the present disclosure.

As shown in FIG. 4, on the basis of at least one embodiment of the pixel circuit shown in FIG. 3, the pixel circuit may further comprise an initialization circuit 41;

the initialization circuit 41 is electrically connected to an initial control line GR, a second initial voltage terminal 12 and a control terminal of the driving circuit 14 for writing a second initial voltage Vi2 provided by the second initial voltage terminal I2 into a first terminal of the driving circuit 14 under the control of an initial control signal provided by the initial control line GR.

When the pixel circuit of at least one embodiment of the present disclosure as shown in FIG. 4 is in operation, in an initialization phase, the initialization circuit 41 writes a second initial voltage Vi2 provided by a second initial voltage terminal 12 into a control terminal of the driving circuit 14 under the control of an initial control signal provided by an initial control line GR, so that at the beginning of the data writing phase, the driving circuit 14 can control conduction between a first terminal of the driving circuit 14 and a second terminal of the driving circuit 14 under the control of the potential of the control terminal thereof;

in the data writing phase, the compensation control circuit 31 controls conduction between a control terminal of the driving circuit 14 and a second terminal of the driving circuit 14 under the control of the first scanning signal so as to charge the second energy storage circuit 32 via the data voltage Vdata, and changes the potential of the control terminal of the driving circuit 14 until the driving circuit 14 is disconnected so as to perform threshold voltage compensation;

the pre-charging phase, the initialization phase, and the refresh reset phase are arranged sequentially.

Figure 5:
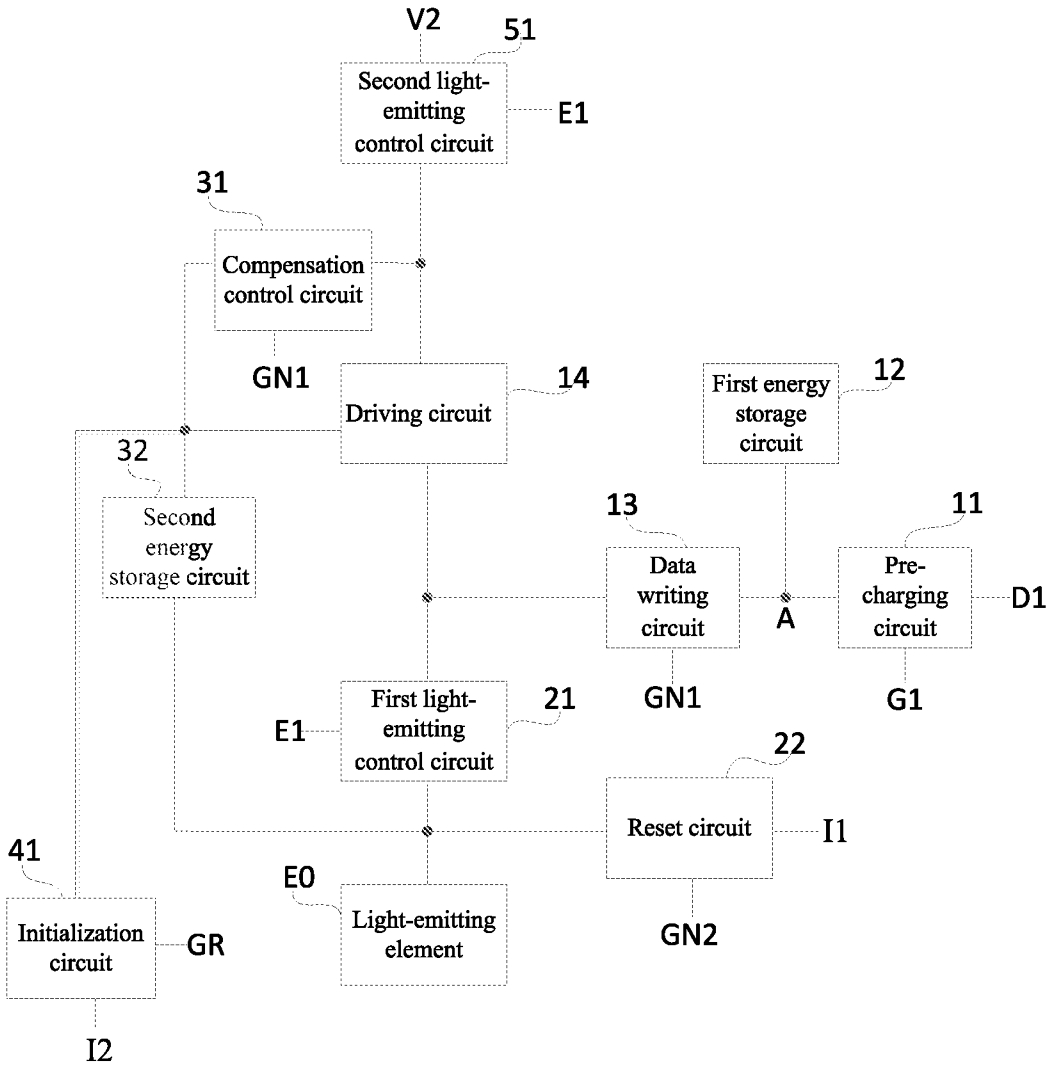
FIG. 5 is a structure diagram of a pixel circuit according to at least one embodiment of the present disclosure.

As shown in FIG. 5, on the basis of the at least one embodiment of the pixel circuit shown in FIG. 4, the pixel circuit according to the at least one embodiment of the present disclosure further comprises a second light-emitting control circuit 51;

the second light-emitting control circuit 51 is electrically connected to a light-emitting control line E1 and a second terminal of the driving circuit 14 and a second voltage terminal V2 for controlling the connection and disconnection between the second terminal of the driving circuit 14 and the second voltage terminal V2 under the control of a light-emitting control signal provided by the light-emitting control line E1.

In at least one embodiment of the present disclosure, the second voltage terminal V2 may be, but is not limited to, a high voltage terminal.

Optionally, the pre-charging circuit comprises a first transistor, the data writing circuit comprises a second transistor, and the first energy storage circuit comprises a first capacitor;

a control electrode of the first transistor is electrically connected to the pre-charging scanning line, a first electrode of the first transistor is electrically connected to the data line, and a second electrode of the first transistor is electrically connected to the pre-charging node;

a control electrode of the second transistor is electrically connected to the first scanning line, a first electrode of the second transistor is electrically connected to the pre-charging node, and a second electrode of the second transistor is electrically connected to the first terminal of the driving circuit;

a first terminal of the first capacitor is electrically connected to the pre-charging node, and a second terminal of the first capacitor is electrically connected to a reference voltage terminal.

Optionally, the first light-emitting control circuit comprises a third transistor, and the reset circuit comprises a fourth transistor;

a control electrode of the third transistor is electrically connected to the light-emitting control line, a first electrode of the third transistor is electrically connected to a first terminal of the driving circuit, and a second electrode of the third transistor is electrically connected to the first electrode of the light-emitting element;

a control electrode of the fourth transistor is electrically connected to the second scanning line, a first electrode of the fourth transistor is electrically connected to the first initial voltage terminal, and a second electrode of the fourth transistor is electrically connected to the first electrode of the light-emitting element.

Optionally, the compensation control circuit comprises a fifth transistor, and the second energy storage circuit comprises a second capacitor;

a control electrode of the fifth transistor is electrically connected to the first scanning line, a first electrode of the fifth transistor is electrically connected to the control terminal of the driving circuit, and a second electrode of the fifth transistor is electrically connected to the second terminal of the driving circuit;

a first terminal of the second capacitor is electrically connected to the control terminal of the driving circuit, and a second terminal of the second capacitor is electrically connected to the first electrode of the light-emitting element.

Optionally, the initialization circuit comprises a sixth transistor;

a control electrode of the sixth transistor is electrically connected to the initial control line, a first electrode of the sixth transistor is electrically connected to the second initial voltage terminal, and a second electrode of the sixth transistor is electrically connected to the control terminal of the driving circuit.

Optionally, the second light-emitting control circuit comprises a seventh transistor;

a control electrode of the seventh transistor is electrically connected to the light-emitting control line, a first electrode of the seventh transistor is electrically connected to the second voltage terminal, and a second electrode of the seventh transistor is electrically connected to the second terminal of the driving circuit.

Optionally, the driving circuit comprises a drive transistor;

a control electrode of the drive transistor is electrically connected to the control terminal of the driving circuit, a first electrode of the drive transistor is electrically connected to the first terminal of the driving circuit, and a second electrode of the drive transistor is electrically connected to the second terminal of the driving circuit.

Figure 6:
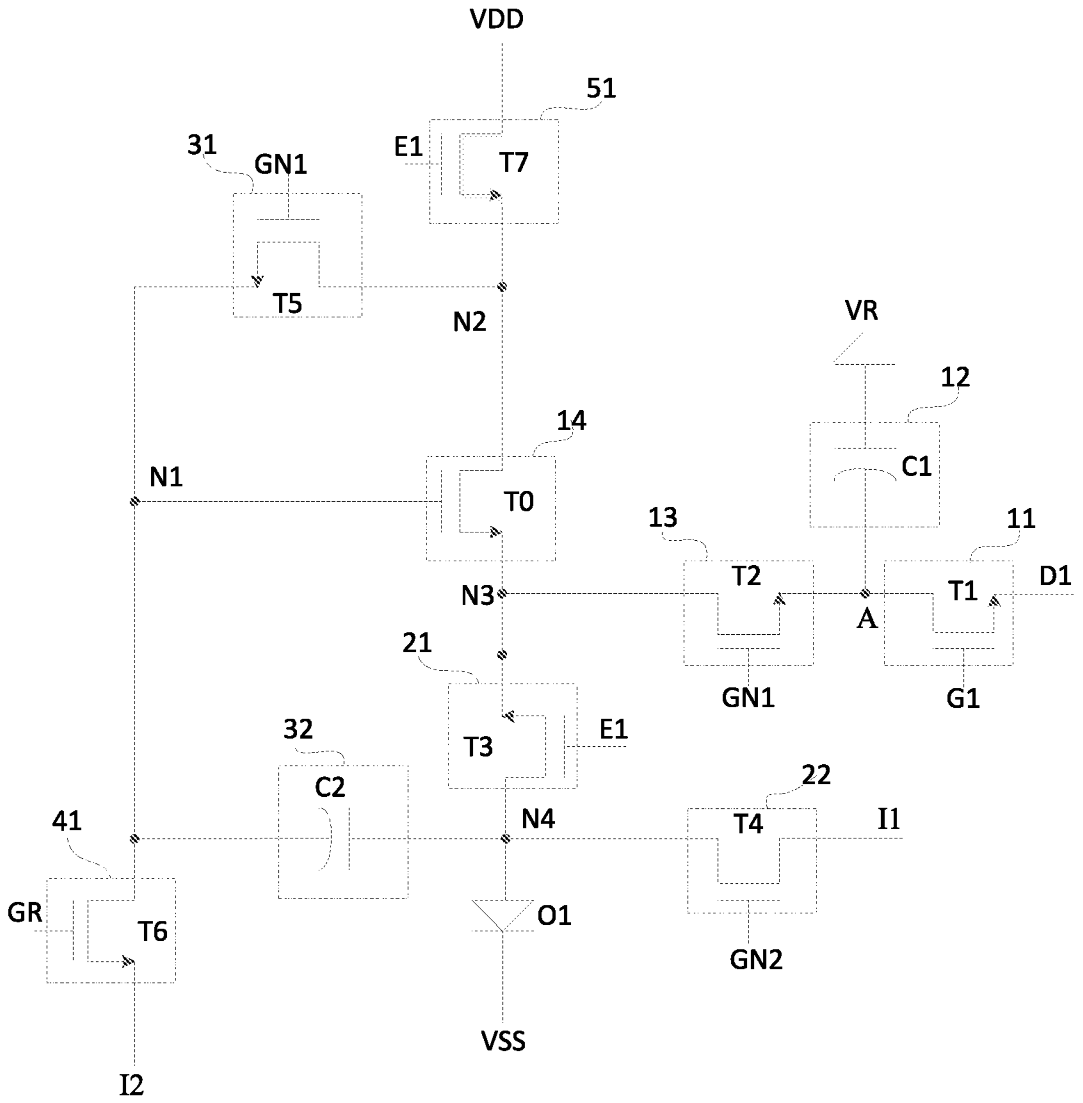
FIG. 6 is a circuit diagram of a pixel circuit according to at least one embodiment of the present disclosure.

As shown in FIG. 6, on the basis of at least one embodiment of the pixel circuit shown in FIG. 5, the pre-charging circuit 11 comprises a first transistor T1, the data writing circuit 13 comprises a second transistor T2, and the first energy storage circuit 12 comprises a first capacitor C1; the driving circuit 14 comprises a drive transistor T0; the light-emitting element is an organic light-emitting diode O1;

a gate electrode of the first transistor T1 is electrically connected to the pre-charging scanning line G1, a source electrode of the first transistor T1 is electrically connected to the data line D1, and a drain electrode of the first transistor T1 is electrically connected to the pre-charging node A;

a gate electrode of the second transistor T2 is electrically connected to the first scanning line GN1, a source electrode of the second transistor T2 is electrically connected to the pre-charging node A, and a drain electrode of the second transistor T2 is electrically connected to a source electrode of the driving circuit TO;

a first terminal of the first capacitor C1 is electrically connected to the pre-charging node A, and a second terminal of the first capacitor C1 is electrically connected to a reference voltage terminal VR; the reference voltage terminal VR is used for providing a reference voltage Vref;

the first light-emitting control circuit 21 comprises a third transistor T3, and the reset circuit 22 comprises a fourth transistor T4;

the gate electrode of the third transistor T3 is electrically connected to the light-emitting control line E1, the source electrode of the third transistor T3 is electrically connected to the source electrode of the drive transistor T0, and the drain electrode of the third transistor T3 is electrically connected to the anode of the organic light-emitting diode O1;

a gate electrode of the fourth transistor T4 is electrically connected to the second scanning line GN2, a source electrode of the fourth transistor T4 is electrically connected to the first initial voltage terminal I1, and the drain electrode of the fourth transistor T4 is electrically connected to the anode of the organic light-emitting diode O1;

the compensation control circuit 31 comprises a fifth transistor T5, and the second energy storage circuit 32 comprises a second capacitor C2;

the gate electrode of the fifth transistor T5 is electrically connected to the first scanning line GN1, the source electrode of the fifth transistor T5 is electrically connected to the gate electrode of the drive transistor T0, and the drain electrode of the fifth transistor T5 is electrically connected to the drain electrode of the drive transistor T0;

a first terminal of the second capacitor C2 is electrically connected to a gate electrode of the drive transistor T0, and a second terminal of the second capacitor C2 is electrically connected to an anode of the organic light-emitting diode O1; the cathode of O1 is electrically connected to the low voltage terminal VSS;

the initialization circuit 41 comprises a sixth transistor T6;

the gate electrode of the sixth transistor T6 is electrically connected to the initial control line GR, the source electrode of the sixth transistor T6 is electrically connected to the second initial voltage terminal 12, and the drain electrode of the sixth transistor T6 is electrically connected to the gate electrode of the drive transistor T0;

the second light-emitting control circuit 51 comprises a seventh transistor T7;

the gate electrode of the seventh transistor T7 is electrically connected to the light-emitting control line E1, the source electrode of the seventh transistor T7 is electrically connected to the high voltage terminal VDD, and the drain electrode of the seventh transistor T7 is electrically connected to the drain electrode of the drive transistor T0.

In at least one embodiment of the display circuit shown in FIG. 6, all of the transistors are N-type transistors and all of the transistors are oxide thin film transistors, but this is not a limitation.

In FIG. 6, a first node N1 is electrically connected to the gate electrode of T0, a second node N2 is electrically connected to the source electrode of T0, a third node N3 is electrically connected to the drain electrode of T0, and a fourth node N4 is electrically connected to the anode of O1.

In at least one embodiment of the present disclosure, the first initial voltage Vi1 provided by I1 may be a low voltage signal provided by the low voltage terminal VSS, when T4 is on while controlling the conduction between N4 and I1, the difference between the anode voltage of O1 and the cathode voltage of O1 is less than the turn-on voltage of O1, and O1 does not emit light.

In at least one embodiment of the present disclosure, the voltage value of the first initial voltage Vi1 provided by I1 may also be less than the voltage value of the low voltage signal provided by the low voltage terminal VSS such that O1 does not emit light when T4 is on.

In at least one embodiment of the present disclosure, a GOA (Gate On Array, array substrate row driving) module providing a pre-charging scanning signal for a pre-charging scanning line G1 cannot be shared with a GOA module providing a first scanning signal, and a GOA (Gate On Array, array substrate row driving) module providing a pre-charging scanning signal for a pre-charging scanning line G1 cannot be shared with a GOA module providing a second scanning signal, so as to prevent a multi-line mis-charge situation from occurring.

Figure 7:
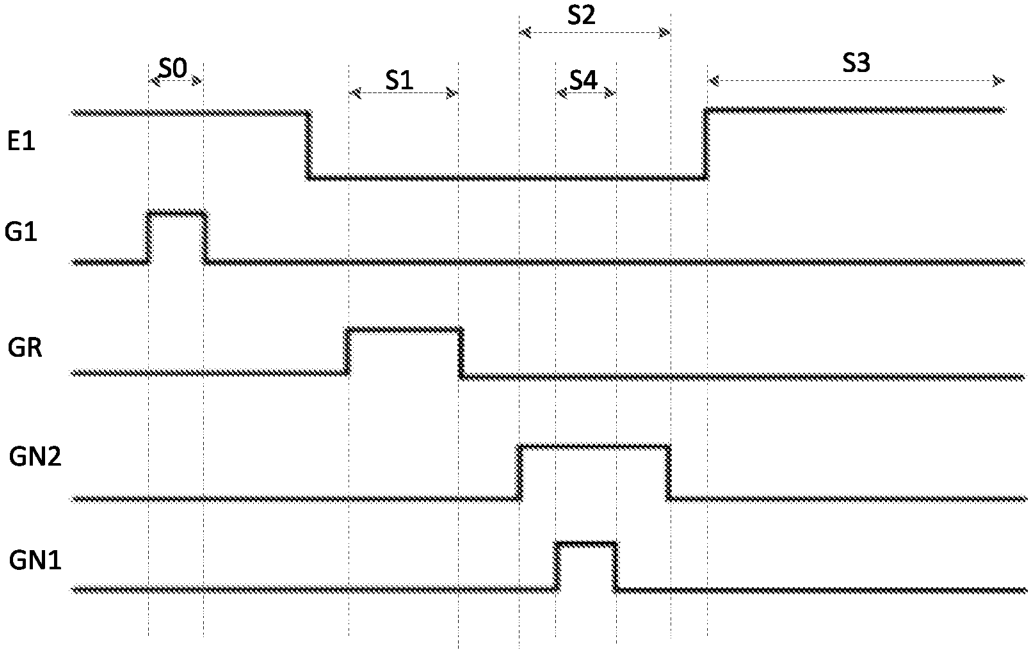
FIG. 7 is an operation timing diagram of at least one embodiment of the pixel circuit shown in FIG. 6.

As shown in FIG. 7, in at least one embodiment of the display circuit shown in FIG. 6 of the present disclosure, during operation, during high-frequency display, a refresh frame may comprise a pre-charging phase S0, an initialization phase S1, the refresh reset phase S2 and a light-emitting phase S3 which are arranged successively, and a data writing phase S4 is comprised in the refresh reset phase S2;

A pre-charging phase S0 is set at a previous frame time, and the previous frame time is a frame time set before the refresh frame;

In a pre-charging phase S0, E1 provides a high voltage signal, G1 provides a high voltage signal, GR provides a high voltage signal, GN1 provides a low voltage signal, GN2 provides a low voltage signal, T1 is open, and D1 provides a data voltage Vdata, and charges C1 via the Vdata, and stores the Vdata in C1;

In an initialization phase S1, E1 provides a low voltage signal, GR provides a high voltage signal, GN1 and GN2 both provide a low voltage signal, T6 is opened, and I2 provides a second initial voltage Vi2 to the gate electrode of T0, so that T0 can be opened at the beginning of a data writing phase S4;

In a refresh reset phase S2, E1 provides a low voltage signal, G1 provides a low voltage signal, GR provides a low voltage signal, GN2 provides a high voltage signal, and I1 provides an anode of a first initial voltage Vi1 to O1, so that O1 does not emit light;

At the beginning of the data writing phase S4, T0 can be turned on, GN1 provides a high voltage signal, and T2 is turned on so as to write the Vdata stored in C1 into the source electrode of T0 via T2; at this moment, T5 is turned on, and C2 is charged via Vdata so as to change the potential of the first node N1 until T0 is turned off, at this moment, the potential of the gate electrode of T0 is Vdata+Vth, and Vth is the threshold voltage of TO;

In the light emission phase S3, E1 provides a high voltage signal, G1, GR, GN1 and GN2 all provide a low voltage signal, T3 and T7 are turned on, and T0 drives O1 to emit light.

In at least one embodiment of the present disclosure, such as the display circuit shown in FIG. 6, there is a capacitance between N1 and N4 during operation, so that when N1 is charged, the potential of N4 needs to be controlled to be stable, so that in at least one embodiment of the present disclosure, the data writing phase S4 may be set to be included in the refresh reset phase S2.

In at least one embodiment of the present disclosure, the duration of the refresh reset phase S2 may be greater than or equal to the duration of the data writing phase S4, and the duration of the refresh reset phase S2 may be greater than the duration of the initialization phase S1;

The data writing phase S4 may last longer than the pre-charging phase S0.

In at least one embodiment of the present disclosure, the data writing phase S4 may last longer than the pre-charging phase S0; for example, the ratio of the duration of the data writing phase S4 to the duration of the pre-charging phase S0 may be greater than or equal to 10 and less than or equal to 100, and preferably, the ratio of the duration of the data writing phase S4 to the duration of the pre-charging phase S0 may be greater than or equal to 40 and less than or equal to 100, but is not limited thereto.

In at least one embodiment of the present disclosure, the data writing phase S4 may be included in the refresh reset phase S2, or the data writing phase S4 may be the same phase as the refresh reset phase S2.

If GN1 outputs a high voltage signal in the pre-charging phase S0, then the data voltage provided in the pre-charging phase S0 and D1 is provided to N3, and thus there is no pre-charging step, and therefore GN1 cannot output a high voltage signal in the pre-charging phase S0;

If the GN1 provides a high voltage signal in the initialization phase S1, then in the initialization phase S1, 12 provides a second initial voltage Vi2 to the gate electrode of T0, and T2 is opened so as to write a data voltage into the third node N3, so that in the initialization phase S1, TO will conduct, and therefore the GN1 cannot provide a high voltage signal in the initialization phase S1;

If GN1 provides a high voltage signal during the light-emitting phase S3, since T7, TO and T3 are all turned on at this time, and a data voltage is written into the third node N3, the display will be affected, and therefore GN1 cannot provide a high voltage signal during the light-emitting phase S3;

Thus, the data writing phase S4 may be included in the refresh reset phase S2, or the data writing phase S4 may be the same phase as the refresh reset phase S2.

Figure 8:
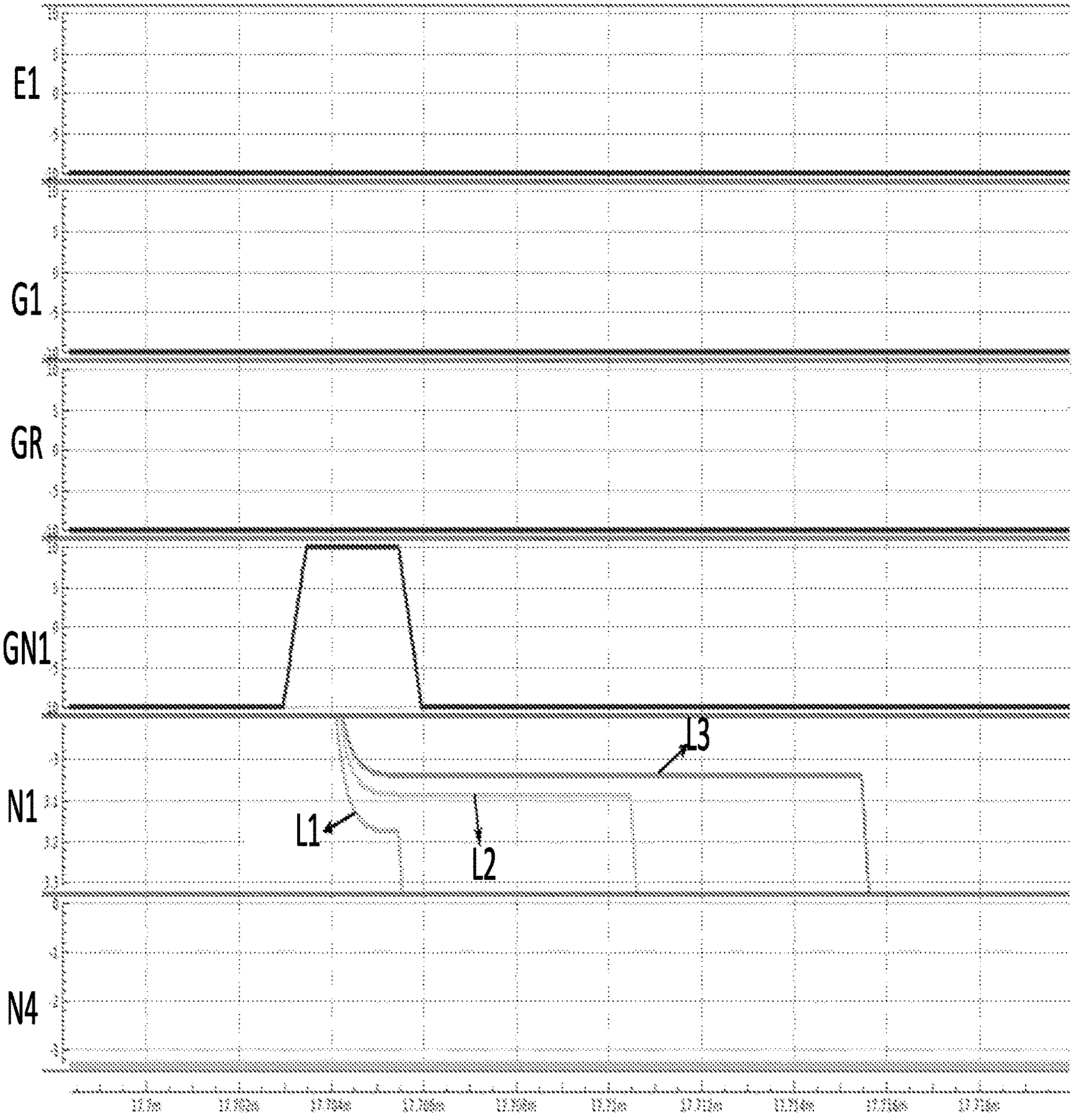
FIG. 8 is a simulated operation timing diagram of at least one embodiment of the display circuit shown in FIG. 6 of the present disclosure.

FIG. 8 is a timing diagram of simulated operation of the display circuit shown in FIG. 6 of the present disclosure.

In FIG. 8, L1 is a waveform of the potential of the first node N1 when the data writing phase S4 has a duration of 2 μs; L2 is a waveform of the potential of the first node N1 when the data writing phase S4 lasts 5 μs; L3 is a waveform of the potential of the first node N1 when the data writing phase S4 lasts 10 μs.

Figure 9:
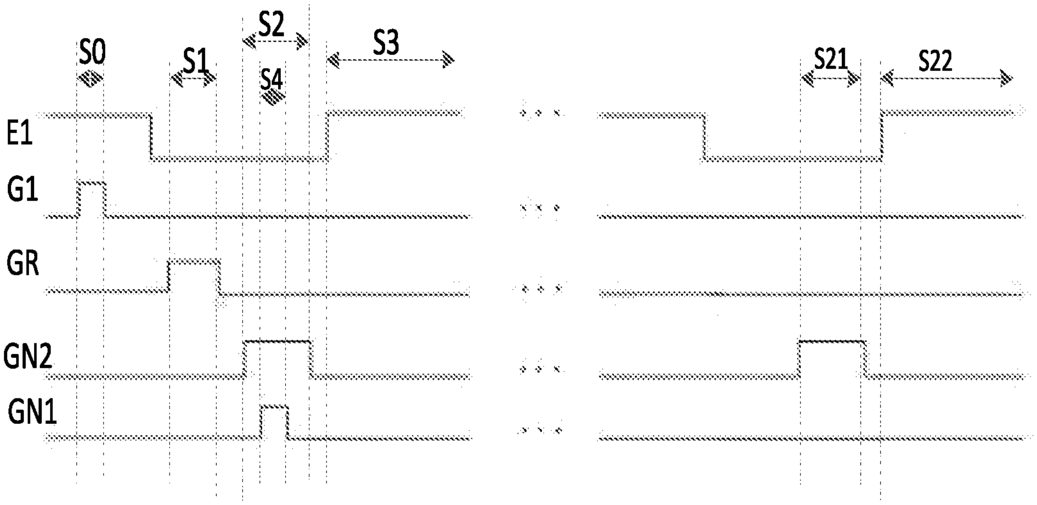
FIG. 9 is another operation timing diagram of at least one embodiment of the pixel circuit shown in FIG. 6.

As shown in FIG. 9, when the display circuit of at least one embodiment of the present disclosure as shown in FIG. 6 is in operation, when performing low frequency display, the display period may comprise a refresh frame and at least one holding frame;

The refresh frame may comprise a pre-charging phase S0, an initialization phase S1, the refresh reset phase S2 and a light-emitting phase S3 which are arranged successively, and the data writing phase S4 is contained in the refresh reset phase S2;

A pre-charging phase S0 is set at a previous frame time, and the previous frame time is a frame time set before the refresh frame;

In a pre-charging phase S0, E1 provides a high voltage signal, G1 provides a high voltage signal, GR provides a high voltage signal, GN1 provides a low voltage signal, GN2 provides a low voltage signal, T1 is open, and D1 provides a data voltage Vdata, and charges C1 via the Vdata, and stores the Vdata in C1;

In an initialization phase S1, E1 provides a low voltage signal, GR provides a high voltage signal, GN1 and GN2 both provide a low voltage signal, T6 is opened, and I2 provides a second initial voltage Vi2 to the gate electrode of T0, so that T0 can be opened at the beginning of a data writing phase S4;

In a refresh reset phase S2, E1 provides a low voltage signal, G1 provides a low voltage signal, GR provides a low voltage signal, GN2 provides a high voltage signal, and I1 provides an anode of a first initial voltage Vi1 to O1, so that O1 does not emit light;

At the beginning of the data writing phase S4, T0 can be turned on, GN1 provides a high voltage signal, and T2 is turned on so as to write the Vdata stored in C1 into the source electrode of T0 via T2; at this moment, T5 is turned on, and C2 is charged via Vdata so as to change the potential of the first node N1 until T0 is turned off, at this moment, the potential of the gate electrode of T0 is Vdata+Vth, and Vth is the threshold voltage of TO;

In the light-emitting phase S3, E1 provides a high voltage signal, G1, GR, GN1 and GN2 all provide a low voltage signal, T3 and T7 are turned on, and T0 drives O1 to emit light;

The holding frame comprises a holding reset phase S21 and a holding light-emitting phase S22 which are arranged successively;

In the holding reset phase S21, E1 provides a low voltage signal, G1 provides a low voltage signal, GR provides a low voltage signal, GN2 provides a high voltage signal, GN1 provides a low voltage signal, T4 is on, I1 provides a first initial voltage Vi1 to the anode of O1, so that O1 does not emit light;

In the holding light-emitting phase S22, E1 provides a high voltage signal, G1, G2, GN1 and GN2 all provide a low voltage signal, T3 and T7 are turned on, and T0 drives O1 to emit light.

Figure 10:
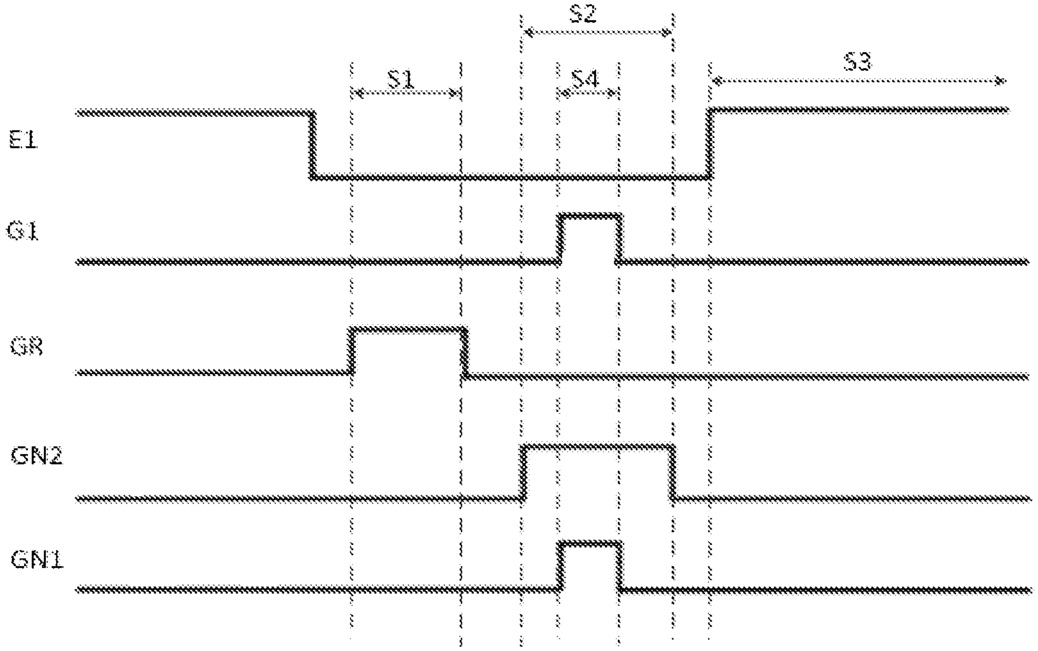
FIG. 10 is an operation timing diagram of at least one embodiment of the pixel circuit shown in FIG. 6.

When the display circuit of at least one embodiment of the present disclosure as shown in FIG. 6 is in operation, when performing low frequency display, the display period may comprise a refresh frame and at least one holding frame;

Since the duration of the display period is relatively long when displaying at a low frequency, the duration of the refresh frame can be set relatively long, and therefore the time for data writing and threshold compensation will be sufficient;

Then, pre-charging may not be performed at this time, and as shown in FIG. 10, during the refresh frame, during the data writing phase S4, both G1 and GN1 may provide a high voltage signal, and D1 provides the data voltage Vdata, with T1 and T2 turned on to charge C2 via Vdata.

Figure 11:
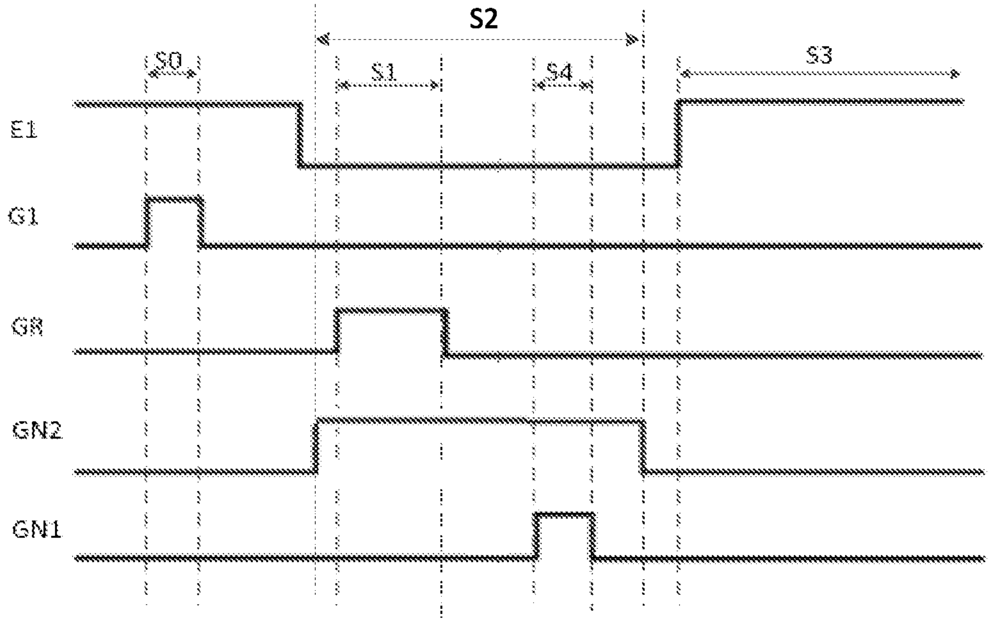
FIG. 11 is an operation timing diagram of at least one embodiment of the pixel circuit shown in FIG. 6.

As shown in FIG. 11, in operation of at least one embodiment of the pixel circuit of the present disclosure as shown in FIG. 6, the refresh reset phase S2 may comprise the initialization phase S1 and the data writing phase S4; the refresh reset phase S2 and the light-emitting phase S3 are independent from each other;

In the refresh reset phase S2, E1 provides a low voltage signal, G1 provides a low voltage signal, GR provides a low voltage signal, GN2 provides a high voltage signal, and I1 provides an anode of a first initial voltage Vi1 to O1 such that O1 does not emit light.

Figure 12:
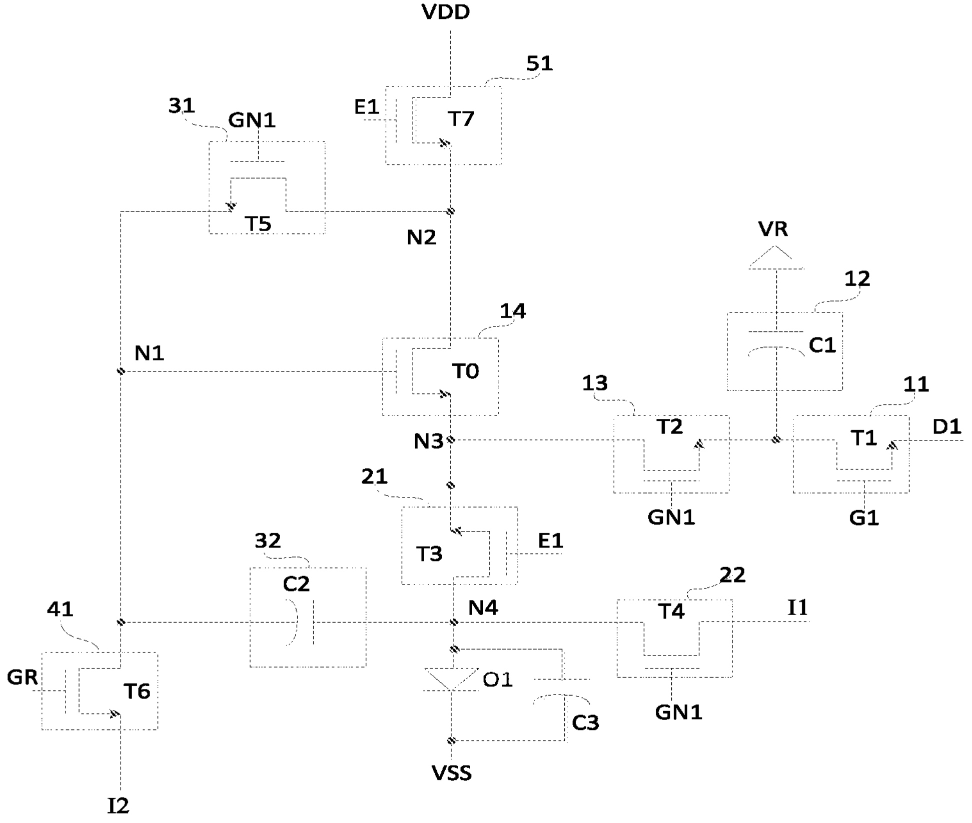
FIG. 12 is a circuit diagram of a pixel circuit according to at least one embodiment of the present disclosure.

At least one embodiment of the pixel circuit shown in FIG. 12 of the present disclosure differs from at least one embodiment of the display circuit shown in FIG. 6 of the present disclosure in that: the gate electrode of T4 is electrically connected to GN1, and a third capacitor C3 is added; A first terminal of C3 is electrically connected to the anode of O1 and a second terminal of C3 is electrically connected to the low voltage terminal VSS.

The use of the second scanning line GN2 is reduced in at least one embodiment of the pixel circuit shown in FIG. 12 of the present disclosure, so that a GOA module for providing a second scanning signal to the second scanning line GN2 is not required, facilitating a narrow frame.

At least one embodiment of the pixel circuit shown in FIG. 12 of the present disclosure is suitable for high frequency displays.

Figure 13:
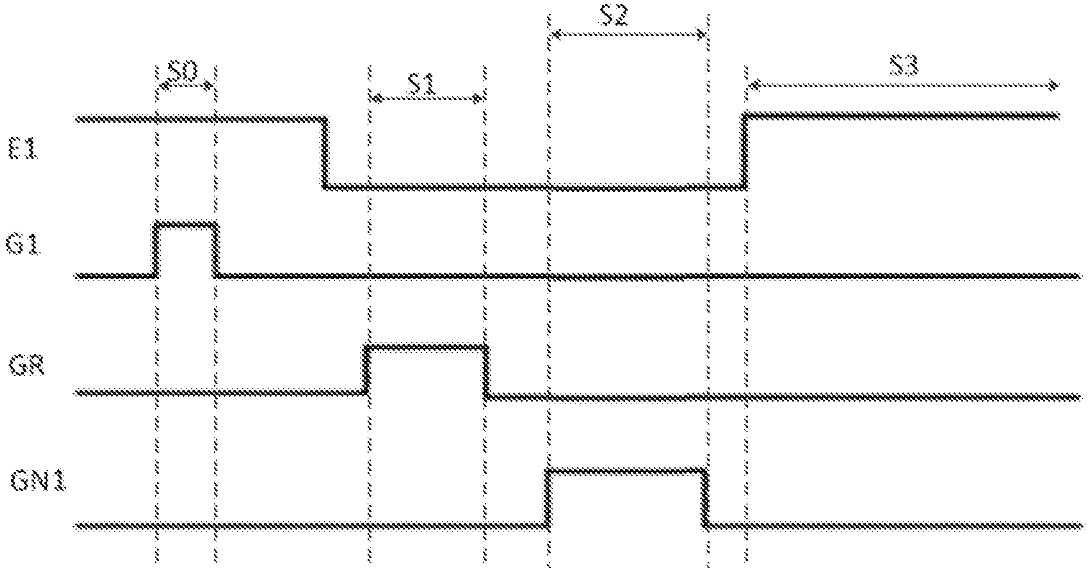
FIG. 13 is an operation timing diagram of at least one embodiment of the pixel circuit shown in FIG. 12 of the present disclosure.

As shown in FIG. 13, at least one embodiment of the pixel circuit shown in FIG. 12 of the present disclosure, in operation, when displaying at a high frequency, a refresh frame may comprise a pre-charging phase S0, an initialization phase S1, the refresh reset phase S2 and a light-emitting phase S3 which are arranged successively, and the data writing phase and the refresh reset phase S2 are the same time period;

a pre-charging phase S0 is set at a previous frame time, and the previous frame time is a frame time set before the refresh frame;

in a pre-charging phase S0, E1 provides a high voltage signal, G1 provides a high voltage signal, GR provides a high voltage signal, GN1 provides a low voltage signal, T1 is open, and D1 provides a data voltage Vdata, charging C1 via the Vdata, and storing the Vdata in C1;

in an initialization phase S1, E1 providing a low voltage signal, GR providing a high voltage signal, and GN1 all providing a low voltage signal, T6 being opened, and I2 providing a second initial voltage Vi2 to the gate electrode of T0, so that T0 can be opened at the beginning of a data writing phase S4;

in a refresh reset phase S2, E1 provides a low voltage signal, G1 provides a low voltage signal, GR provides a low voltage signal, GN1 provides a high voltage signal, and I1 provides an anode of a first initial voltage Vi1 to O1, so that O1 does not emit light;

at the beginning of the refresh reset phase S4, T0 can be turned on, GN1 provides a high voltage signal, and T2 is turned on so as to write the Vdata stored in C1 into the source electrode of T0 via T2; at this moment, T5 is turned on, and C2 is charged via Vdata so as to change the potential of the first node N1 until T0 is turned off, at this moment, the potential of the gate electrode of T0 is Vdata+Vth, and Vth is the threshold voltage of TO;

in the light emission phase S3, E1 provides a high voltage signal, G1, GR and GN1 all provide a low voltage signal, T3 and T7 are turned on, and T0 drives O1 to emit light.

Figure 14:
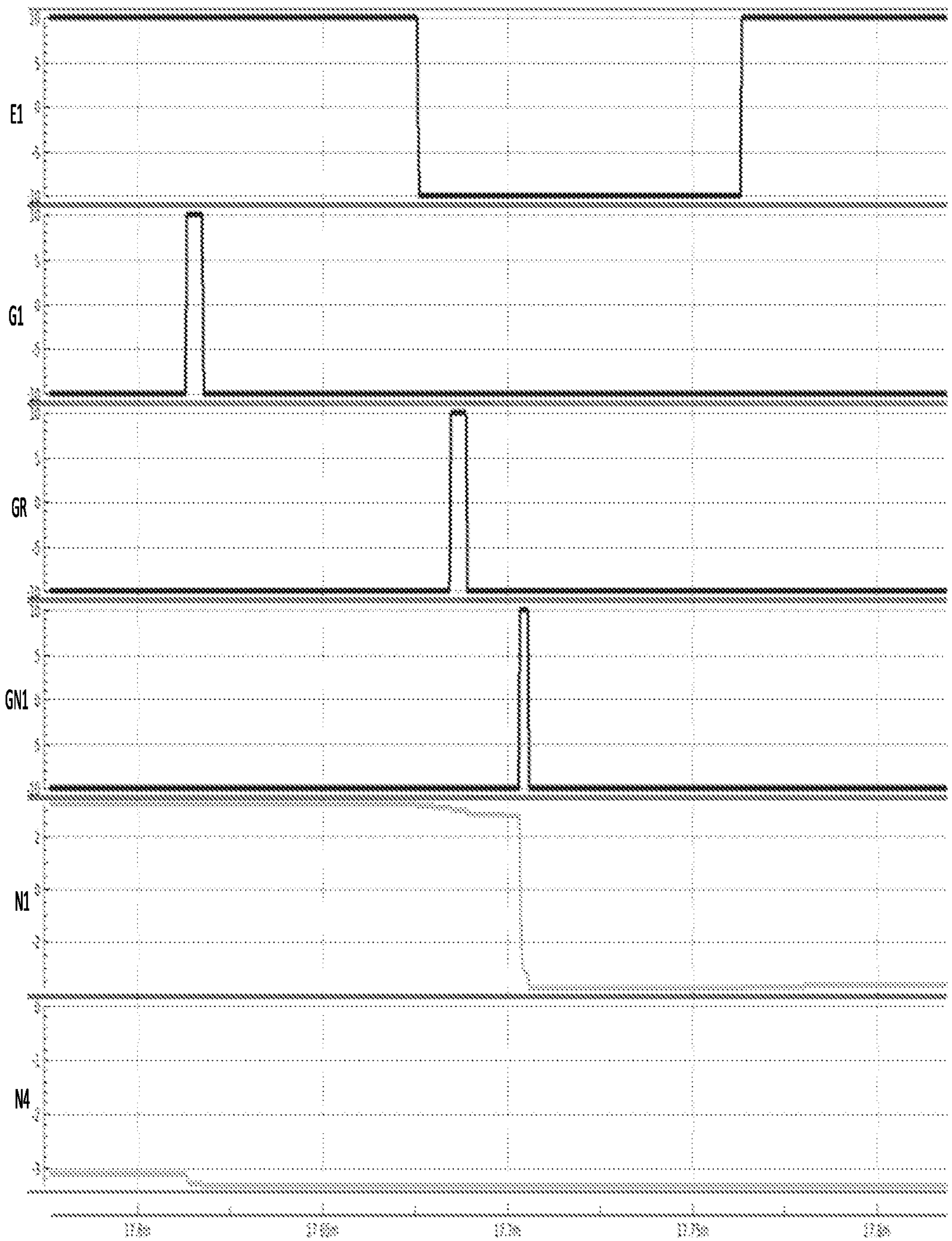
FIG. 14 is a simulated operation timing diagram of at least one embodiment of the pixel circuit shown in FIG. 12.

FIG. 14 is a timing diagram of simulated operation of at least one embodiment of the pixel circuit shown in FIG. 12.

A display panel according to at least one embodiment of the present disclosure, comprising the above-described pixel circuit;

the pre-charging circuit is configured for writing a data voltage provided by the data line into a pre-charging node under the control of a pre-charging scanning signal provided by the scanning line in a pre-charging phase so as to charge a first energy storage circuit using the data voltage;

the data writing circuit is configured for controlling conduction between the pre-charging node and the first terminal of the driving circuit under control of a first scanning signal provided by a first scanning line during a data writing phase.

In a specific implementation, the data writing phase may be included in the current frame, and the pre-charging phase may be included in the previous frame; and the embodiment of the present disclosure firstly charges the data voltage provided by the data line into the first energy storage circuit using a pre-charging circuit before the data voltage is written into the first terminal of the driving circuit, so that when displaying at a high frequency, in the data writing phase, the threshold voltage compensation is not limited by the line scanning time, and the threshold voltage compensation can be completed, which is suitable for ultra-high frequency refresh, especially for a medium-large size, achieving full band support from low frequency to high frequency.

In at least one embodiment of the present disclosure, the pixel circuit further comprises a first light-emitting control circuit and a reset circuit;

the reset circuit is configured for writing a first initial voltage provided by a first initial voltage terminal into a first electrode of a light-emitting element under the control of a second scanning signal provided by a second scanning line in a refresh reset phase, so as to control the light-emitting element not to emit light;

the first light-emitting control circuit is configured for controlling the disconnection between a first terminal of the driving circuit and a first electrode of the light-emitting element under the control of a light-emitting control signal provided by a light-emitting control line during a refresh reset phase;

the refresh reset phase is the same phase as the data writing phase, or the data writing phase is included in the refresh reset phase.

Optionally, the pixel circuit further comprises a compensation control circuit, a second energy storage circuit and an initialization circuit;

the initialization circuit is configured for writing, in an initialization phase, a second initial voltage provided by a second initial voltage terminal into a control terminal of the driving circuit under the control of an initial control signal provided by an initial control line, so that, at the beginning of the data writing phase, the driving circuit can control conduction between the first terminal of the driving circuit and the second terminal of the driving circuit under the control of the potential of the control terminal of the driving circuit;

the compensation control circuit is configured for controlling, under the control of a first scanning signal, conduction between the control terminal of the driving circuit and the second terminal of the driving circuit during the data writing phase so as to charge a second energy storage circuit using the data voltage, and changing the potential of the control terminal of the driving circuit until the driving circuit is disconnected so as to perform threshold voltage compensation;

the pre-charging phase, the initialization phase, and the refresh reset phase are arranged sequentially.

In at least one embodiment of the present disclosure, the display panel may further include a second light-emitting control circuit;

the first light-emitting control circuit is configured for controlling conduction between the first terminal of the driving circuit and the first electrode of the light-emitting element under the control of the light-emitting control signal in a refresh light-emitting phase;

the second light-emitting control circuit is configured for controlling the conduction between the second terminal of the driving circuit and a second voltage terminal under the control of the light-emitting control signal in the refresh light-emitting phase;

the driving circuit is configured for driving the light-emitting element to emit light during the refresh light-emitting phase;

the light emission phase is arranged after the refresh reset phase.

Optionally, the initialization phase, the data writing phase, and the refresh light-emitting phase are included in a refresh frame, and the pre-charging phase is included in a previous frame time of the refresh frame.

In at least one embodiment of the present disclosure, a display period includes the refresh frame, the display period further including at least one holding frame disposed after the refresh frame; the holding frame comprises a holding reset phase and a holding light-emitting phase which are arranged successively;

the reset circuit is configured for writing a first initial voltage provided by a first initial voltage terminal into a first electrode of a light-emitting element under the control of a second scanning signal provided by a second scanning line in the holding reset phase, so as to control the light-emitting element not to emit light, so as to solve the problem of display flicker when displaying at a low frequency;

the first light-emitting control circuit is configured for controlling, under the control of the light-emitting control signal, conduction between a first terminal of the driving circuit and a first electrode of the light-emitting element during the holding light-emitting phase;

the second light-emitting control circuit is configured for controlling the conduction between the second terminal of the driving circuit and the second voltage terminal under the control of the light-emitting control signal during the holding light-emitting phase;

the driving circuit is configured for driving the light-emitting element to emit light during the holding light-emitting phase.

A display device according to an embodiment of the present disclosure includes a plurality of rows and a plurality of columns of the above-described pixel circuits.

Optionally, the pre-charging circuit comprised in the (2N−1)th-row Mth-column pixel circuit and the pre-charging circuit comprised in the 2Nth-row Mth-column pixel circuit are electrically connected to the Nth pre-charging scanning line;

the pre-charging circuit included in the (2N−1)th-row Mth-column pixel circuit is electrically connected to a (2M−1)th-column data line, and the pre-charging circuit included in the 2Nth-row Mth-column pixel circuit is electrically connected to the 2Mth-column data line;

the pre-charging circuit included in the (2N−1)th-row Mth-column pixel circuit is configured for writing a data voltage provided by the (2M−1)th-column data line into a pre-charging node in the (2N−1)th-row Mth-column pixel circuit under the control of an Nth pre-charging scanning signal provided by the Nth pre-charging scanning line;

the pre-charging circuit included in a 2Nth-row Mth-column pixel circuit is configured for writing a data voltage provided by the 2Mth-column data line into the pre-charging node in the 2Nth-row Mth-column pixel circuit under the control of the Nth pre-charging scanning signal provided by the Nth pre-charging scanning line;

N and M are both positive integers.

In at least one embodiment of the present disclosure, when the pre-charging circuit included in the (2N−1)th-row Mth-column pixel circuit and the pre-charging circuit included in the 2Nth-row Mth-column pixel circuit are electrically connected to the same pre-charging scanning line, and the pre-charging circuit included in the (2N−1)th-row Mth-column pixel circuit and the pre-charging circuit included in the 2Nth-row Mth-column pixel circuit are electrically connected to different column data lines, the refresh frequency of the display panel can be further improved, for example, 240 Hz high-frequency refresh can be realized.

In at least one embodiment of the present disclosure, the pre-charging circuit comprised in the (2N−1)th-row Mth-column pixel circuit and the pre-charging circuit comprised in the 2Nth-row Mth-column pixel circuit are electrically connected to the Nth pre-charging scanning line, that is to say, the pre-charging circuit of a pixel circuit of an adjacent row can be electrically connected to the same pre-charging scanning line; and if pixel circuits of multiple rows are used for pre-charging, since C1 has a discharge loss, in order to achieve a high-frequency display effect, the previous row can be used as the pre-charging circuit.

Figure 15:
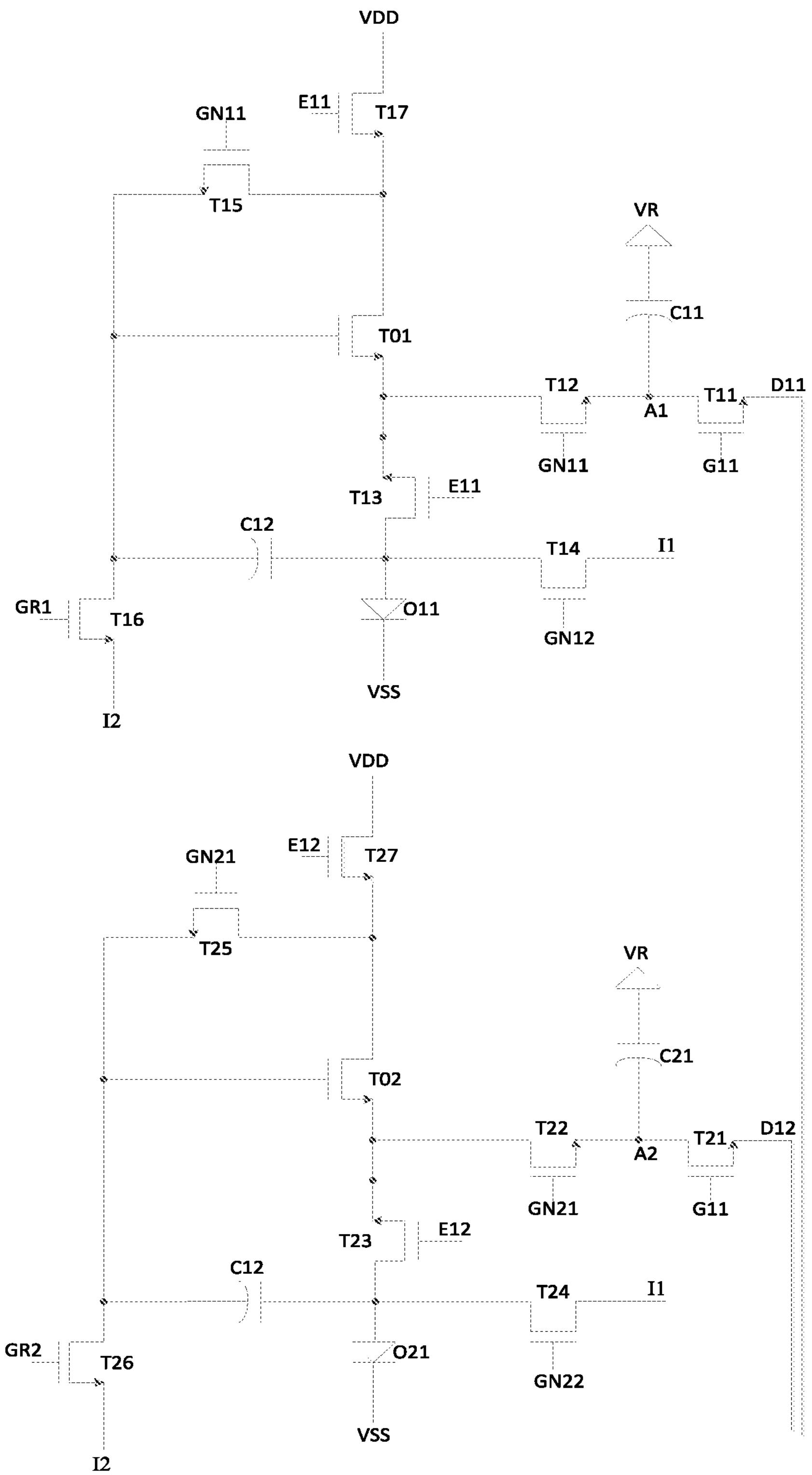
FIG. 15 is a structure diagram of two pixel circuits in a display panel according to an embodiment of the present disclosure.

As shown in FIG. 15, a first row and a first column of pixel circuits comprises a first row and a first column of organic light-emitting diodes (O11), a first transistor (T11), a first second transistor (T12), a first third transistor (T13), a first fourth transistor (T14), a first fifth transistor (T15), a first sixth transistor (T16), a first seventh transistor (T17), a first capacitor (C11), a first second capacitor (C12) and a first drive transistor (T01);

a gate electrode of T11 is electrically connected to the first pre-charging scanning line G11, a source electrode of T11 is electrically connected to the first data line D11, and a drain electrode of T1 is electrically connected to the first pre-charging node A1;

the gate electrode of T12 is electrically connected to the first row of the first scanning line GN11, the source electrode of T12 is electrically connected to the first pre-charging node A1, and the drain electrode of T12 is electrically connected to the source electrode of T01;

a first terminal of C11 is electrically connected to the first pre-charging node A1, and a second terminal of C11 is electrically connected to the reference voltage terminal VR;

the gate electrode of T13 is electrically connected to the first row light-emitting control line E11, the source electrode of T13 is electrically connected to the source electrode of T01, and the drain electrode of T13 is electrically connected to the anode of O11; the cathode of the O11 is electrically connected to the low voltage terminal VSS;

a gate electrode of T14 is electrically connected to the first row second scanning line GN12, the source electrode of T14 is electrically connected to the first initial voltage terminal I1, and the drain electrode of T14 is electrically connected to the anode of O11;

the gate electrode of T15 is electrically connected to the first row first scanning line GN11, the source electrode of T15 is electrically connected to the gate electrode of T01, and the drain electrode of T15 is electrically connected to the drain electrode of T01;

a first terminal of C12 is electrically connected to a gate electrode of T01, and a second terminal of C12 is electrically connected to an anode electrode of O11;

the gate electrode of T16 is electrically connected to the first row initial control line GR1, the source electrode of T16 is electrically connected to the second initial voltage terminal I2, and the drain electrode of T16 is electrically connected to the gate electrode of T01;

the gate electrode of T17 is electrically connected to the first row light-emitting control line E11, the source electrode of T17 is electrically connected to the VDD, and the drain electrode of T17 is electrically connected to the drain electrode of T01;

the second row and first column pixel circuit comprises a second row and first column organic light-emitting diode O21, a second first transistor T21, a second transistor T22, a second third transistor T23, a second fourth transistor T24, a second fifth transistor T25, a second sixth transistor T26, a second seventh transistor T27, a second first capacitor C21, a second second capacitor C22 and a second drive transistor T02;

the gate electrode of T21 is electrically connected to the first pre-charging scanning line G11, the source electrode of T21 is electrically connected to the second data line D12, and the drain electrode of T21 is electrically connected to the second pre-charging node A2;

the gate electrode of T22 is electrically connected to the second row of the first scanning line GN21, the source electrode of T22 is electrically connected to the second pre-charging node A2, and the drain electrode of T22 is electrically connected to the source electrode of T02;

a first terminal of C21 is electrically connected to a second pre-charging node A2, and a second terminal of C21 is electrically connected to a reference voltage terminal VR;

the gate electrode of T23 is electrically connected to the second row of light-emitting control lines E12, the source electrode of T23 is electrically connected to the source electrode of T02, and the drain electrode of T23 is electrically connected to the anode of O21; the cathode of the O21 is electrically connected to the low voltage terminal VSS;

the gate electrode of T24 is electrically connected to the second scanning line GN22 of the second row; the source electrode of T24 is electrically connected to the first initial voltage terminal I1; and the drain electrode of T24 is electrically connected to the anode of O21;

the gate electrode of the T25 is electrically connected to the second row of the first scanning line GN21, the source electrode of the T25 is electrically connected to the gate electrode of the T02, and the drain electrode of the T25 is electrically connected to the drain electrode of the T02;

a first terminal of C22 is electrically connected to a gate electrode of T02, and a second terminal of C22 is electrically connected to an anode electrode of O21;

the gate electrode of the T26 is electrically connected to the second row initial control line GR2, the source electrode of the T26 is electrically connected to the second initial voltage terminal 12, and the drain electrode of the T26 is electrically connected to the gate electrode of the T02;

the gate electrode of T27 is electrically connected to the second row of light-emitting control lines E12, the source electrode of T27 is electrically connected to the VDD, and the drain electrode of T27 is electrically connected to the drain electrode of T02.

In the circuit shown in FIG. 15, all transistors are N-type transistors and all transistors are oxide thin film transistors.

In operation of at least one embodiment of the pixel circuit shown in FIG. 15 of the present disclosure, since the gate electrode of T11 and the gate electrode of T21 are both electrically connected to the first pre-charging scanning line G11, the source electrode of T11 is electrically connected to the first data line D11, and the source electrode of T21 is electrically connected to the second data line D12, then T11 and T12 can be conducted at the same time to control the charging of the first pre-charging node A1 and the second pre-charging node A2 respectively via the data voltage on D11 and the data voltage on D12, and therefore the display refresh frequency can be raised, for example, the display refresh frequency can be up to 240 Hz.

In at least one embodiment of the pixel circuit shown in FIG. 15, GN11 may be the same as GN21, GR1 may be the same as GR2, E11 may be the same as E12, and GN12 may be the same as GN22, but is not limited thereto.

Figure 16:
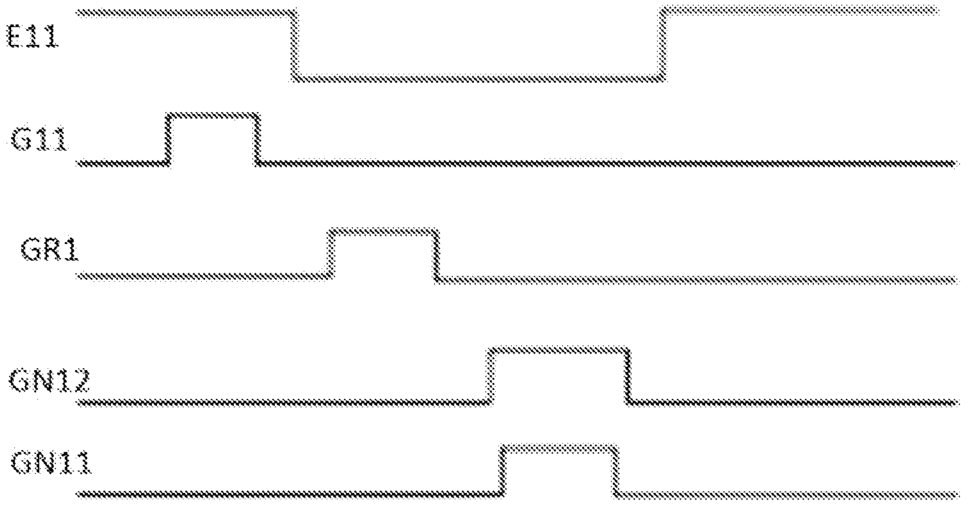
FIG. 16 is an operation timing diagram of the pixel circuit shown in FIG. 15.

FIG. 16 is an operation timing diagram of the pixel circuit shown in FIG. 15.

As shown in FIG. 16, the potential of the first pre-charge scanning signal provided by G11 lasts for a long time at a high voltage, for example, the potential of the first pre-charge scanning signal provided by G11 lasts for a long time at a high voltage may be twice as long as the potential of the pre-charge scanning signal provided by G1, but is not limited thereto.

In at least one embodiment of the present disclosure, the potential of the first row of the first scanning signal provided by the GN11 lasts for a high voltage is greater than the potential of the first pre-charging scanning signal provided by the G11 lasts for a high voltage, for example, the ratio between the potential of the first row of the first scanning signal provided by the GN11 lasts for a high voltage and the potential of the first pre-charging scanning signal provided by the G11 lasts for a high voltage may be greater than or equal to 5 and less than or equal to 50, but is not limited thereto.

In at least one embodiment of the present disclosure, the potential of the first pre-charge scanning signal provided by G11 lasts for a higher voltage than the potential of the pre-charge scanning signal provided by G1 lasts for a higher voltage.

The display device provided by the embodiments of the present disclosure can be any product or component having a display function such as a mobile phone, a tablet computer, a television, a display, a notebook computer, a digital photo frame, a navigator, etc.

While the foregoing is directed to the preferred embodiments of the present disclosure, it will be understood by those skilled in the art that numerous modifications and adaptations may be made without departing from the principles of the disclosure, and such modifications and adaptations are interpreted to be within the scope of the disclosure.

What is claimed is:

1. A pixel circuit, comprising: a light-emitting element, a pre-charging circuit, a first energy storage circuit, a data writing circuit and a driving circuit; wherein the pre-charging circuit is electrically connected to a pre-charging scanning line, a data line and a pre-charging node for writing a data voltage provided by the data line into the pre-charging node under a control of a pre-charging scanning signal provided by the pre-charging scanning line;

the first energy storage circuit is electrically connected to the pre-charging node for storing electric energy;

the data writing circuit is electrically connected to a first scanning line, the pre-charging node and a first terminal of the driving circuit for controlling a connection or disconnection between the pre-charging node and the first terminal of the driving circuit under a control of a first scanning signal provided by the first scanning line;

the first terminal of the driving circuit is electrically connected to the light-emitting element for driving the light-emitting element;

wherein the pixel circuit further comprises a second energy storage circuit, a first terminal of the second energy storage circuit is electrically connected to a control terminal of the driving circuit, a second terminal of the second energy storage circuit is directly connected to a first electrode of the light-emitting element, and the second energy storage circuit is used for storing electric energy.

2. The pixel circuit according to claim 1, further comprising a first light-emitting control circuit and a reset circuit; wherein the first terminal of the driving circuit is electrically connected to the first electrode of the light-emitting element via the first light-emitting control circuit;

the first light-emitting control circuit is electrically connected to a light-emitting control line for controlling a connection or disconnection between a first terminal of the driving circuit and the first electrode of the light-emitting element under a control of a light-emitting control signal provided by the light-emitting control line;

the reset circuit is electrically connected to a second scanning line, a first initial voltage terminal and the first electrode of the light-emitting element for writing a first initial voltage provided by the first initial voltage terminal into the first electrode of the light-emitting element under a control of a second scanning signal provided by the second scanning line;

a second electrode of the light-emitting element is electrically connected to a first voltage terminal.

3. The pixel circuit according to claim 1, further comprising a compensation control circuit; wherein the compensation control circuit is electrically connected to the first scanning line, the control terminal of the driving circuit and a second terminal of the driving circuit for controlling a connection or disconnection between the control terminal of the driving circuit and the second terminal of the driving circuit under a control of the first scanning signal.

4. The pixel circuit according to claim 1, further comprising an initialization circuit; wherein the initialization circuit is electrically connected to an initial control line, a second initial voltage terminal and the control terminal of the driving circuit for writing a second initial voltage provided by the second initial voltage terminal into the control terminal of the driving circuit under a control of an initial control signal provided by the initial control line.

5. The pixel circuit according to claim 1, further comprising a second light-emitting control circuit; wherein the second light-emitting control circuit is electrically connected to a light-emitting control line, a second terminal of the driving circuit and a second voltage terminal for controlling a connection or disconnection between the second terminal of the driving circuit and the second voltage terminal under a control of a light-emitting control signal provided by the light-emitting control line.

6. The pixel circuit according to claim 1, wherein the pre-charging circuit comprises a first transistor, the data writing circuit comprises a second transistor, and the first energy storage circuit comprises a first capacitor;

a control electrode of the first transistor is electrically connected to the pre-charging scanning line, a first electrode of the first transistor is electrically connected to the data line, and a second electrode of the first transistor is electrically connected to the pre-charging node;

a control electrode of the second transistor is electrically connected to the first scanning line, a first electrode of the second transistor is electrically connected to the pre-charging node, and a second electrode of the second transistor is electrically connected to the first terminal of the driving circuit;

a first terminal of the first capacitor is electrically connected to the pre-charging node, and a second terminal of the first capacitor is electrically connected to a reference voltage terminal.

7. The pixel circuit according to claim 2, wherein the first light-emitting control circuit comprises a third transistor, and the reset circuit comprises a fourth transistor;

a control electrode of the third transistor is electrically connected to the light-emitting control line, a first electrode of the third transistor is electrically connected to a first terminal of the driving circuit, and a second electrode of the third transistor is electrically connected to the first electrode of the light-emitting element;

a control electrode of the fourth transistor is electrically connected to the second scanning line, a first electrode of the fourth transistor is electrically connected to the first initial voltage terminal, and a second electrode of the fourth transistor is electrically connected to the first electrode of the light-emitting element.

8. The pixel circuit according to claim 3, wherein the compensation control circuit comprises a fifth transistor, and the second energy storage circuit comprises a second capacitor;

a control electrode of the fifth transistor is electrically connected to the first scanning line, a first electrode of the fifth transistor is electrically connected to the control terminal of the driving circuit, and a second electrode of the fifth transistor is electrically connected to the second terminal of the driving circuit;

a first terminal of the second capacitor is electrically connected to the control terminal of the driving circuit, and a second terminal of the second capacitor is electrically connected to the first electrode of the light-emitting element.

9. The pixel circuit according to claim 4, wherein the initialization circuit comprises a sixth transistor;

a control electrode of the sixth transistor is electrically connected to the initial control line, a first electrode of the sixth transistor is electrically connected to the second initial voltage terminal, and a second electrode of the sixth transistor is electrically connected to the control terminal of the driving circuit.

10. The pixel circuit according to claim 5, wherein the second light-emitting control circuit comprises a seventh transistor;

a control electrode of the seventh transistor is electrically connected to the light-emitting control line, a first electrode of the seventh transistor is electrically connected to the second voltage terminal, and a second electrode of the seventh transistor is electrically connected to the second terminal of the driving circuit.

11. The pixel circuit according to claim 3, wherein the driving circuit comprises a drive transistor;

a control electrode of the drive transistor is electrically connected to the control terminal of the driving circuit, a first electrode of the drive transistor is electrically connected to the first terminal of the driving circuit, and a second electrode of the drive transistor is electrically connected to the second terminal of the driving circuit.

12. A display panel comprising a pixel circuit, the pixel circuit comprising: a light-emitting element, a pre-charging circuit, a first energy storage circuit, a data writing circuit and a driving circuit; wherein the pre-charging circuit is electrically connected to a pre-charging scanning line, a data line and a pre-charging node for writing a data voltage provided by the data line into the pre-charging node under a control of a pre-charging scanning signal provided by the pre-charging scanning line;

the first energy storage circuit is electrically connected to the pre-charging node for storing electric energy;

the data writing circuit is electrically connected to a first scanning line, the pre-charging node and a first terminal of the driving circuit for controlling a connection or disconnection between the pre-charging node and the first terminal of the driving circuit under a control of a first scanning signal provided by the first scanning line;

the first terminal of the driving circuit is electrically connected to the light-emitting element for driving the light-emitting element;

wherein, the pre-charging circuit is configured for writing a data voltage provided by the data line into a pre-charging node under a control of a pre-charging scanning signal provided by the scanning line in a pre-charging phase so as to charge a first energy storage circuit using the data voltage;

the data writing circuit is configured for controlling conduction between the pre-charging node and the first terminal of the driving circuit under control of a first scanning signal provided by a first scanning line during a data writing phase;

wherein the pixel circuit further comprises a second energy storage circuit, a first terminal of the second energy storage circuit is electrically connected to a control terminal of the driving circuit, a second terminal of the second energy storage circuit is directly connected to a first electrode of the light-emitting element, and the second energy storage circuit is used for storing electric energy.

13. The display panel according to claim 12, wherein the pixel circuit further comprises a first light-emitting control circuit and a reset circuit;

the reset circuit is configured for writing a first initial voltage provided by a first initial voltage terminal into a first electrode of a light-emitting element under a control of a second scanning signal provided by a second scanning line in a refresh reset phase, so as to control the light-emitting element not to emit light;

a first light-emitting control circuit is configured for controlling the disconnection between a first terminal of the driving circuit and the first electrode of the light-emitting element under a control of a light-emitting control signal provided by a light-emitting control line during the refresh reset phase;

the refresh reset phase is the same phase as the data writing phase, or the data writing phase is comprised in the refresh reset phase.

14. The display panel according to claim 13, wherein the pixel circuit further comprises a compensation control circuit and an initialization circuit;

the initialization circuit is configured for writing, in an initialization phase, a second initial voltage provided by a second initial voltage terminal into the control terminal of the driving circuit under a control of an initial control signal provided by an initial control line, so that, at the beginning of the data writing phase, the driving circuit can control conduction between the first terminal of the driving circuit and a second terminal of the driving circuit under a control of the potential of the control terminal of the driving circuit;

the compensation control circuit is configured for controlling, under a control of a first scanning signal, conduction between the control terminal of the driving circuit and the second terminal of the driving circuit during the data writing phase so as to charge a second energy storage circuit using the data voltage, and changing the potential of the control terminal of the driving circuit until the driving circuit is disconnected so as to perform threshold voltage compensation;

the pre-charging phase, the initialization phase, and the refresh reset phase are arranged sequentially.

15. The display panel according to claim 14, wherein the pixel circuit further comprises a second light-emitting control circuit;

the first light-emitting control circuit is configured for controlling conduction between the first terminal of the driving circuit and the first electrode of the light-emitting element under a control of the light-emitting control signal in a refresh light-emitting phase;

the second light-emitting control circuit is configured for controlling the conduction between the second terminal of the driving circuit and a second voltage terminal under the control of the light-emitting control signal in the refresh light-emitting phase;

the driving circuit is configured for driving the light-emitting element to emit light during the refresh light-emitting phase;

the light emission phase is arranged after the refresh reset phase.

16. The display panel according to claim 15, wherein the initialization phase, the data writing phase, and the refresh light-emitting phase are comprised in a refresh frame, and the pre-charging phase is comprised in a previous frame time of the refresh frame.

17. The display panel according to claim 16, wherein a display period comprises the refresh frame, and the display period further comprises at least one holding frame arranged after the refresh frame; the holding frame comprises a holding reset phase and a holding light-emitting phase which are arranged successively;

the reset circuit is configured for writing a first initial voltage provided by a first initial voltage terminal into the first electrode of the light-emitting element under the control of the second scanning signal provided by the second scanning line in the holding reset phase, so as to control the light-emitting element not to emit light;

the first light-emitting control circuit is configured for controlling, under the control of the light-emitting control signal, conduction between a first terminal of the driving circuit and the first electrode of the light-emitting element during the holding light-emitting phase;

the second light-emitting control circuit is configured for controlling the conduction between the second terminal of the driving circuit and the second voltage terminal under the control of the light-emitting control signal during the holding light-emitting phase;

the driving circuit is configured for driving the light-emitting element to emit light during the holding light-emitting phase.

18. A display device comprising a plurality of rows and columns of pixel circuits as claimed in claim 1.

19. The display device according to claim 18, wherein a pre-charging circuit comprised in a (2N−1)th-row Mth-column pixel circuit and a pre-charging circuit comprised in a 2Nth-row Mth-column pixel circuit are electrically connected to an Nth pre-charging scanning line;

the pre-charging circuit comprised in the (2N−1)th-row Mth-column pixel circuit is electrically connected to a (2M−1)th-column data line, and the pre-charging circuit comprised in the 2Nth-row Mth-column pixel circuit is electrically connected to the 2Mth-column data line;

the pre-charging circuit comprised in the (2N−1)th-row Mth-column pixel circuit is configured for writing a data voltage provided by the (2M−1)th-column data line into a pre-charging node in the (2N−1)th-row Mth-column pixel circuit under a control of an Nth pre-charging scanning signal provided by the Nth pre-charging scanning line;

the pre-charging circuit comprised in a 2Nth-row Mth-column pixel circuit is configured for writing a data voltage provided by the 2Mth-column data line into the pre-charging node in the 2Nth-row Mth-column pixel circuit under the control of the Nth pre-charging scanning signal provided by the Nth pre-charging scanning line;

N and M are both positive integers.

* * * * *